(12) United States Patent
Kim et al.

(10) Patent No.: US 9,031,016 B2
(45) Date of Patent: May 12, 2015

(54) METHOD AND APPARATUS FOR TRANSMITTING AND RECEIVING PDCCH USING DCI HAVING ADJUSTED SIZE

(75) Inventors: So Yeon Kim, Anyang-si (KR); Sung Ho Moon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 13/521,205

(22) PCT Filed: Jan. 11, 2011

(86) PCT No.: PCT/KR2011/000165
§ 371 (c)(1),
(2), (4) Date: Jul. 9, 2012

(87) PCT Pub. No.: WO2011/084026
PCT Pub. Date: Jul. 14, 2011

(65) Prior Publication Data
US 2013/0010714 A1 Jan. 10, 2013

Related U.S. Application Data

(60) Provisional application No. 61/293,719, filed on Jan. 11, 2010, provisional application No. 61/294,110, filed on Jan. 12, 2010, provisional application No. 61/307,806, filed on Feb. 24, 2010.

(30) Foreign Application Priority Data

Jan. 10, 2011 (KR) .................. 10-2011-0002282

(51) Int. Cl.
*H04W 4/00* (2009.01)
*H04L 1/00* (2006.01)
*H04L 5/00* (2006.01)

(52) U.S. Cl.
CPC .............. *H04L 1/0038* (2013.01); *H04L 5/001* (2013.01); *H04L 5/0053* (2013.01)

(58) Field of Classification Search
CPC ...... H04L 1/0038; H04L 5/001; H04L 5/0053
USPC .......................................... 370/329
See application file for complete search history.

(56) References Cited

U.S. PATENT DOCUMENTS

| | | |
|---|---|---|
| 2005/0128993 A1 | 6/2005 | Yu et al. |
| 2008/0095223 A1 | 4/2008 | Tong et al. |

(Continued)

FOREIGN PATENT DOCUMENTS

| | | |
|---|---|---|
| CN | 101507140 A | 8/2009 |
| CN | 10155678 A | 10/2009 |

(Continued)

OTHER PUBLICATIONS

Clarifications of PDCCH Search Space, Qualcomm Europe, 3GPP TSG-RAN WG1 #53bis Jun. 30th-Jul. 4th, 2008 Warsaw, Poland.*

(Continued)

*Primary Examiner* — Brian Roberts
*Assistant Examiner* — Shah R Zaman
(74) *Attorney, Agent, or Firm* — McKenna Long & Aldridge LLP

(57) ABSTRACT

The present invention relates to a method for adjusting a size of an information bit used in a control channel and an apparatus for performing the same. In addition, the present invention relates to a method for searching for a control channel including an information bit having an adjusted size. A method for receiving a physical downlink control channel (PDCCH) in a wireless access system for supporting multi-carriers as one embodiment of the present invention comprises the steps of: performing blind decoding in a search space allocated in a terminal to search for a PDCCH; and receiving the PDCCH including downlink control information (DCI) having a size adjusted in the search space. At this time, the size of the DCI can be adjusted by considering a bandwidth allocated in the terminal, a transmission mode of a component carrier (CC) allocated in the terminal, and the number of antennas of the terminal.

16 Claims, 11 Drawing Sheets

(56) References Cited

U.S. PATENT DOCUMENTS

| | | | |
|---|---|---|---|
| 2009/0257449 A1* | 10/2009 | Chen et al. | 370/470 |
| 2010/0254268 A1* | 10/2010 | Kim et al. | 370/241 |
| 2012/0044921 A1* | 2/2012 | Chung et al. | 370/338 |
| 2012/0243499 A1* | 9/2012 | Moon et al. | 370/329 |
| 2013/0010619 A1* | 1/2013 | Fong et al. | 370/252 |
| 2013/0016672 A1* | 1/2013 | Yang et al. | 370/329 |
| 2014/0169313 A1* | 6/2014 | Yang et al. | 370/329 |

FOREIGN PATENT DOCUMENTS

| | | |
|---|---|---|
| KR | 20080081537 A | 9/2008 |
| KR | 10-2009-0083269 A | 8/2009 |
| KR | 10-2009-0086040 A | 8/2009 |

OTHER PUBLICATIONS

PDCCH on common search space, Panasonic, 3GPP TSG-RAN WG1 Meeting #53bis Warsaw, Poland, Jun. 30-Jul. 4, 2008.*

DCI format and blind decoding for L TE-Advanced, Panasonic, 3GPP TSG-RAN WG1 Meeting #58bis Miyazaki, Japan, Oct. 12-16, 2009.*

R1-093941, "DCI Format and Blind Decoding for LTE-Advanced", 3GPP TSG RAN WG1 Meeting #58bis, Oct. 12-16, 2009.

R1-082543, "Clarifications of PDCCH Search Space", 3GPP TSG RAN WG1 Meeting #53bis, Jun. 30-Jul. 4, 2009.

R1-082628, "PDCCH on Common Search Space", 3GPP TSG RAN WG1 Meeting #53bis, Jun. 30-Jul. 4, 2009.

* cited by examiner

METHOD AND APPARATUS FOR TRANSMITTING AND RECEIVING PDCCH USING DCI HAVING ADJUSTED SIZE This Application is a 35 U.S.C. §371 National Stage Entry of International Application No. PCT/KR2011/000165, filed Jan. 11, 2011 and claims the benefit of U.S. Provisional Application Nos. 61/293,719, filed Jan. 11, 2010, 61/294,110, filed Jan. 12, 2010, 61/307,806, filed Feb. 24, 2010, and Korean Application No: 10-2011-0002282, filed Jan. 10, 2011, all of which are incorporated by reference in their entirety herein.

TECHNICAL FIELD

The present invention relates to a communication method and apparatus used in a wireless access system. Particularly, the present invention relates to methods for adjusting the size of information bits used in a control channel and an apparatus for performing the same. The present invention also discloses a method for searching for a control channel using the size-adjusted information bits.

BACKGROUND ART

In a general wireless communication system, typically, a single carrier is considered in uplink and downlink although different bandwidths are set for uplink and downlink. For example, it is possible to provide a wireless communication system based on a single carrier in which the number of carriers constituting each of the uplink and the downlink is 1 and bandwidths of the uplink and the downlink are symmetrical to each other.

The international telecommunication union (ITU) requires that candidate technologies for IMT-Advanced support a bandwidth extended compared to a conventional wireless communication system. However, it is difficult to allocate frequencies of large bandwidths throughout the world, except for some regions. Thus, as a technology for efficiently using small fragmented bands, a carrier aggregation technology which is also referred to as bandwidth aggregation or spectrum aggregation has been developed to allow a number of physical bands to be combined in the frequency domain to be used as a large logical band.

Carrier aggregation has been introduced in order to support increased throughput, to prevent cost increase due to introduction of broadband RF elements and to guarantee compatibility with existing systems. Carrier aggregation enables data exchange between a UE and an eNB through a plurality of groups of bandwidth-based carriers, which are defined in a conventional wireless access system (for example, in the LTE system in the case of the LTE-A system or in the IEEE 802.16e system in the case of the IEEE 802.16m system).

Here, bandwidth-based carriers defined in the conventional wireless communication system may be referred to as component carriers (CCs). Carrier aggregation technologies may include, for example, a technology that combines up to 5 CCs to support system bandwidths of up to 100 MHz even though a single CC supports a bandwidth of 5 MHz, 10 MHz or 20 MHz.

When such carrier aggregation technology is used, data can be simultaneously transmitted or received through a number of uplink/downlink CCs. Accordingly, the UE may monitor and measure all CCs.

DISCLOSURE

Technical Problem

In order to support an independent transmission mode of each Component Carrier (CC) or system SW of each CC in such a multiple-carrier aggregation situation, the UE needs to decode Downlink Control Information (DCI) that is to be monitored. Here, when the number of DCI sizes increases, the number of Blind Decodings (BDs) that the UE performs for PDCCH detection also increases.

The present invention has been made in order to solve the above problem and an object of the present invention is to provide a method and apparatus for transmitting and receiving data for efficient communication.

Another object of the present invention is to provide a method for adjusting payload sizes of a plurality of types of Downlink Control Information (DCI) having different sizes used in a control channel to reduce blind decoding overhead of the UE.

Another object of the present invention is to provide a UL DCI configuration method for supporting UL fallback and UL grants which are newly defined in the LTE-A system.

Another object of the present invention is to provide an apparatus that support the above methods.

Objects of the present invention are not limited to those described above and other objects can be conceived by a person having ordinary knowledge in the art from the embodiments of the present invention which will be described below.

Technical Solution

To achieve the above objects, the present invention discloses methods for adjusting the size of information bits used in a control channel and apparatuses for performing the same. The present invention also discloses methods for searching for a control channel using such size-adjusted information bits.

In one aspect of the present invention, a method for receiving a Physical Downlink Control Channel (PDCCH) in a wireless access system that supports multiple carriers may include performing blind decoding in a search space allocated to a user equipment in order to search for the PDCCH, and receiving a PDCCH including Downlink Control Information (DCI), whose size has been adjusted, in the search space. Here, the size of the DCI may be adjusted taking into consideration at least one of a bandwidth allocated to the user equipment, a transmission mode of a Component Carrier (CC) allocated to the user equipment, and the number of antennas of the user equipment.

In another aspect of the present invention, a user equipment for receiving a Physical Downlink Control Channel (PDCCH) in a wireless access system that supports multiple carriers may include a transmission unit, a reception unit, and a processor. Here, the user equipment may control the processor and the reception unit to perform blind decoding in a search space allocated to the user equipment in order to search for the PDCCH and to receive a PDCCH including Downlink Control Information (DCI), whose size has been adjusted, in the search space. Here, the size of the DCI may be adjusted taking into consideration at least one of a bandwidth allocated to the user equipment, a transmission mode of a Component Carrier (CC) allocated to the user equipment, and the number of antennas of the user equipment.

In the above aspects of the present invention, the size of the DCI may be adjusted according to the transmission mode of the CC allocated to the user equipment.

The size of the DCI may also be adjusted according to the number of antennas of the user equipment.

The size of the DCI may also be adjusted for DCI formats whose payload sizes slightly change according to the bandwidth.

Sizes of DCI formats whose payload sizes greatly change according to the bandwidth may also be adjusted for each bandwidth group formed through bandwidth grouping.

The size of the DCI may also be adjusted by adjusting sizes of DCI formats other than DCI formats which are transmitted in a common search space.

In the above aspects of the present invention, allocation of at least one of information regarding the bandwidth allocated to the user equipment, information regarding the transmission mode of the CC allocated to the user equipment and information regarding the number of antennas available for the user equipment may be received from a base station through uplink scheduling, a negotiation procedure, a broadcast message, or the like.

The above embodiments of the present invention are part of preferred embodiments of the present invention and various other embodiments in which technical features of the present invention are reflected can be derived and understood by a person having ordinary knowledge in the art from the following detailed description of the present invention.

Advantageous Effects

The embodiments of the present invention have the following advantages.

First, a user equipment (UE) and a base station (BS) can perform efficient communication according to the embodiment of the present invention.

Second, it is possible to significantly reduce blind decoding overhead of the UE by adjusting (or adapting) the payload sizes of a plurality of types of DCI having different sizes.

Third, it is possible to configure UL DCI that supports UL fallback and UL grants defined in the present invention. This can increase scheduling flexibility and the number of blind decodings.

Advantages that can be achieved by the embodiments of the present invention are not limited to those described above and other advantages will be clearly derived and understood by a person having ordinary knowledge in the art from the following description of the embodiments of the present invention. That is, unintended advantages of the embodiments of the present invention may also be derived by a person having ordinary knowledge in the art from the embodiments of the present invention.

BEST MODE

Figure 1:
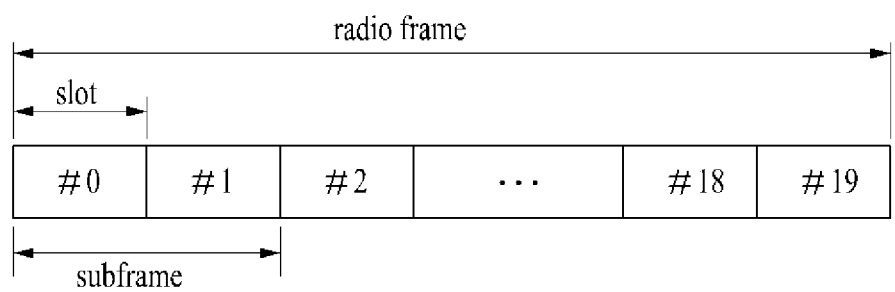
FIG. 1 illustrates the structure of a radio frame in a 3GPP LTE system.

The embodiments of the present invention disclose methods and apparatuses for adjusting the size of information bits used in a control channel.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

The embodiments of the present invention have been described focusing mainly on the data communication relationship between a Mobile Station (MS) and a Base Station (BS). The BS is a terminal node in a network which performs communication directly with the MS. Specific operations which have been described as being performed by the BS may also be performed by an upper node as needed.

That is, it will be apparent to those skilled in the art that the BS or any other network node may perform various operations for communication with MSs in a network including a number of network nodes including BSs. Here, the term "base station (BS)" may be replaced with another term such as "fixed station", "Node B", "eNode B (eNB)", "Advanced Base Station (ABS)", or "access point".

The term "MS" may be replaced with another term such as "User Equipment (UE)", "Subscriber Station (SS)", "Mobile Subscriber Station (MSS)", "mobile terminal", "Advanced MS (AMS)", or "terminal".

The term "transmitting end" refers to a stationary and/or mobile node that transmits data or audio services and "receiving end" refers to a stationary and/or mobile node that receives data or audio services. Thus, in uplink, the MS may be a transmitting end and the base station may be a receiving end. Similarly, in downlink, the MS may be a receiving end and the base station may be a transmitting end.

The embodiments of the present invention can be supported by standard documents of at least one of the IEEE 802.xx system, the 3GPP system, the 3GPP LTE system, and the 3GPP2 system which are wireless access systems. That is, for obvious steps or portions that are not described in the embodiments of the present invention, reference can be made to the standard documents. In addition, for all terms used in this disclosure, reference can be made to the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are provided for better understanding of the present invention and can be replaced with other terms without departing from the spirit of the present invention.

The following technologies can be applied to a variety of wireless access technologies such as Code Division Multiple Access (CDMA), Frequency Division. Multiple Access (FDMA), Time Division Multiple Access (TDMA), Orthogonal Frequency Division Multiple Access (OFDMA), or Single Carrier Frequency Division Multiple Access (SC-FDMA). CDMA may be implemented as a wireless technology (or radio technology) such as Universal Terrestrial Radio Access (UTRA) or CDMA2000. TDMA may be implemented as a wireless technology such as Global System for Mobile communications (GSM)/General Packet Radio Service (GPRS)/Enhanced Data Rates for GSM Evolution (EDGE). OFDMA may be implemented as a wireless technology such as Institute of Electrical and Electronics Engineers (IEEE) 802.11 (Wi-Fi), IEEE 802.16 (WiMAX), IEEE 802-20, or Evolved UTRA (E-UTRA). UTRA is a part of the Universal Mobile Telecommunications System (UMTS). 3rd Generation Partnership Project (3GPP) long term evolution (LTE) is a part of the Evolved UMTS (E-UMTS) which uses E-UTRA. 3GPP LTE employs OFDMA in downlink and employs SC-FDMA in uplink. LTE-Advanced (LTE-A) is an evolution of 3GPP LTE. Although the following description focuses on the 3GPP LTE/LTE-A system in order to clearly explain technical features of the present invention, the spirit of the present invention is not limited to the 3GPP LTE/LTE-A system.

FIG. 1 illustrates the structure of a radio frame in a 3GPP LTE system.

A radio frame includes 10 subframes and one subframe includes 2 slots. A time required to transmit one subframe is referred to as a Transmission Time Interval (TTI). Here, the length of one subframe is 1 ms and the length of one slot is 0.5 ms.

One slot includes a plurality of Orthogonal Frequency Division Multiplexing (OFDM) symbols in the time domain and a plurality of Resource Blocks (RBs) in the frequency domain. An OFDM symbol is defined to represent one symbol period in a 3GPP LTE system that uses an Orthogonal Frequency Division Multiplexing Access (OFDMA) scheme in downlink. That is, the OFDM symbol may be referred to as an SC-FDMA symbol or symbol period according to a multiple access scheme. The RB is a resource allocation unit that includes a plurality of consecutive subcarriers in one slot.

The radio frame structure of FIG. 1 is merely exemplary and the number of subframes included in one radio frame, the number of slots included in one subframe, and the number of OFDM symbols included in one slot may be changed in various ways.

Figure 2:
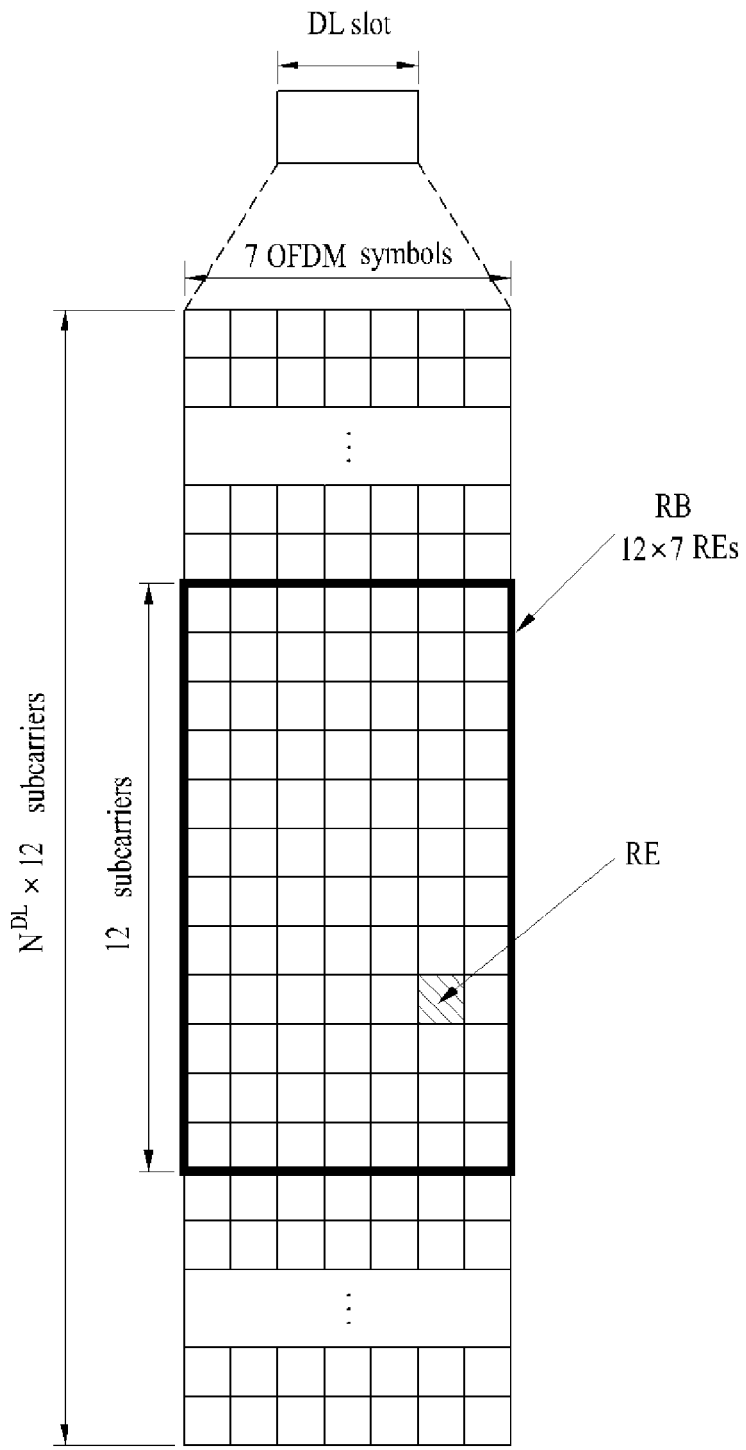
FIG. 2 illustrates a resource grid for one downlink slot.

FIG. 2 illustrates a resource grid for one downlink slot.

One downlink slot includes a plurality of OFDM symbols in the time domain. FIG. 2 shows an example in which one downlink slot includes 7 OFDM symbols and one RB includes 12 subcarriers in the frequency domain.

Each element on the resource grid is referred to as a Resource Element (RE) and one RB includes 12×7 REs. The number of RBs $N^{DL}$ included in one downlink slot depends on a downlink transmission bandwidth set in the cell.

Figure 3:
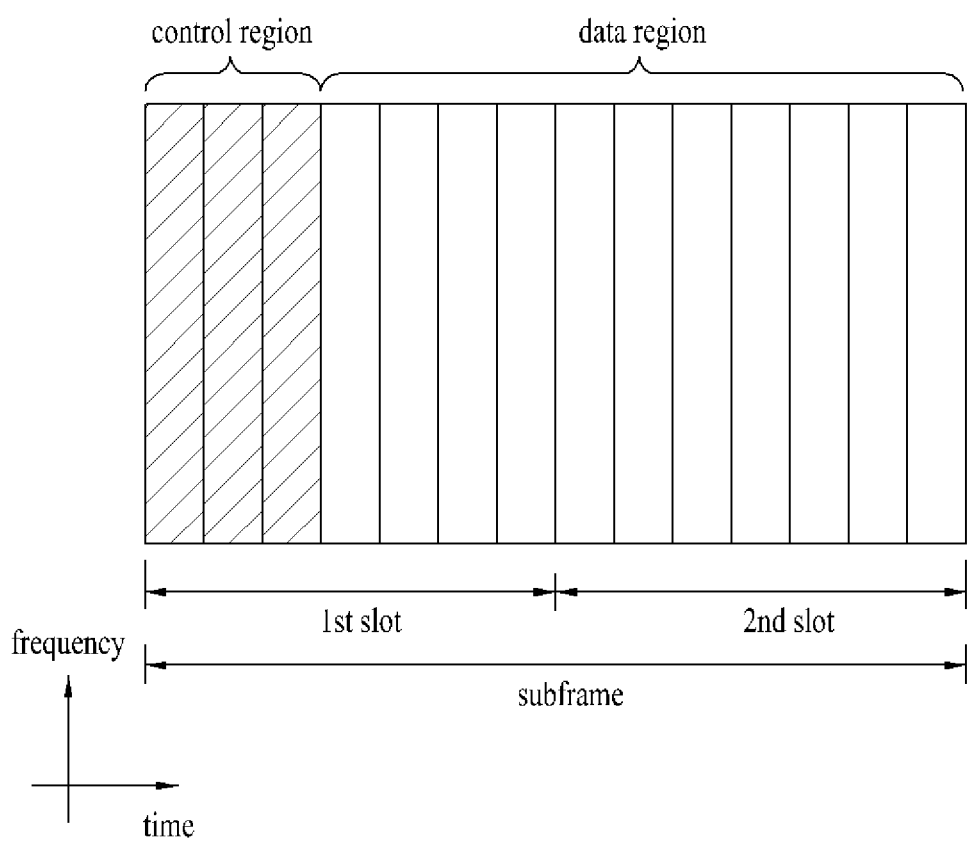
FIG. 3 illustrates the structure of a downlink subframe.

FIG. 3 illustrates the structure of a downlink subframe.

One subframe includes 2 slots in the time domain. Up to 3 front OFDM symbols of the first slot in the subframe correspond to a control region to which control channels are allocated and the remaining OFDM symbols correspond to a data region to which a Physical Downlink Shared Channel (PDSCH) is allocated.

Downlink component carriers used in 3GPP LTE include a Physical Control Format Indicator Channel (PCFICH), a Physical Downlink Control Channel (PDCCH), and a Physical Hybrid-ARQ Indicator Channel (PHICH). The PCFICH that is transmitted in the first OFDM symbol of the subframe carries information regarding the number of OFDM symbols (i.e., the size of the control region) used to transmit component carriers in the subframe. The PHICH carries an acknowledgement/negative-acknowledgement (ACK/NACK) signal for an uplink Hybrid Automatic Repeat Request (HARQ). That is, an ACK/NACK signal for uplink data transmitted by a UE is transmitted through the PHICH.

Control information that is transmitted through the PDCCH is referred to as Downlink Control Information (DCI). The DCI may include uplink resource allocation information, downlink resource allocation information, an uplink transmission power control command for arbitrary UE groups, and the like.

The PDCCH may carry transmission format and resource allocation information of a downlink shared channel (DL-SCH), resource allocation information of an uplink shared channel (UL-SCH), paging information of a paging channel (PCH), system information of a DL-SCH, resource allocation information of a higher layer control message such as a random access response transmitted in a PDSCH, information regarding activation of Voice Of Internet Protocol (VoIP), a transmission power control command, and a transmission power control command set for individual UEs in an arbitrary UE group, and the like.

A plurality of PDCCHs may be transmitted in one control region. The UE may monitor a plurality of PDCCHs. A PDCCH may be transmitted through one or more consecutive Control Channel Elements (CCEs). A CCE is a logical allocation resource that is used to provide a PDCCH using one coding rate based on the condition of a radio channel. A CCE corresponds to a plurality of Resource Element Groups (REGs). The format of the PDCCH and the number of available bits of the PDCCH are determined according to a correlation (or relationship) between a coding rate provided in each CCE and the number of CCEs. The BS determines the format of the PDCCH according to DCI that is to be transmitted to the UE and attaches a CRC to the control information.

The CRC is masked with a unique identifier (Radio Network Temporary Identifier (RNTI)) according to the method of use of the PDCCH or the possessor of the PDCCH. If the PDCCH is for a specific UE, a unique identifier (for example, a Cell-RNTI (C-RNTI)) of the UE is masked with the CRC and, if the PDCCH is for a paging message, a paging indication identifier (for example, Paging-RNTI (P-RNTI)) is masked with the CRC. In addition, if the PDCCH is for system information (specifically, a system information block), system information and a system information RNTI (S-RNTI) may be masked with the CRC. A Random Access RNTI (RA-RNTI) may be masked with the CRC in order to indicate a random access response which is a response to reception of a random access preamble by the UE.

Figure 4:
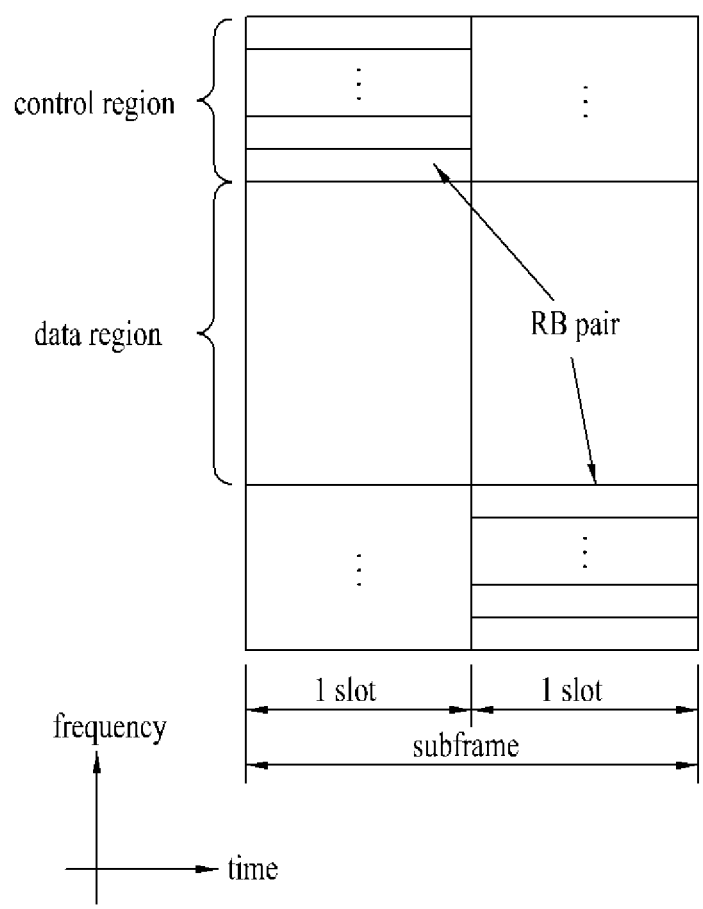
FIG. 4 illustrates an example of an uplink subframe structure.

FIG. 4 illustrates an example of an uplink subframe structure.

As shown in FIG. 4, an uplink subframe may be divided in to a control region to which a Physical Uplink Control Channel (PUCCH) carrying uplink control information is allocated and a data region to which a Physical Uplink Shared Channel (PUSCH) carrying user data is allocated in the frequency domain. The UE does not simultaneously transmit the PUCCH and the PUSCH in order to maintain single carrier characteristics.

A PUCCH for one UE is allocated to an RB pair in one subframe and RBs of the RB pair occupy different subcarriers in 2 slots. That is, the RB pair allocated to the PUCCH is "frequency-hopped" at a slot boundary.

Environments that are taken into consideration in the embodiments of the present invention include all general multicarrier resource environments. That is, the term "multicarrier system" or "carrier aggregation system" used in the present invention refers to a system that uses an aggregation of one or more carriers having a smaller bandwidth than a target bandwidth when configuring a target wideband in order to support wideband. In the present invention, the term "multicarrier" or "multiple carriers" refers to a carrier aggregation (or carrier linkage or combination). Here, the term "carrier aggregation" refers not only to a combination of contiguous carriers but also to a combination of non-contiguous carriers. The term "carrier combination" may be used interchangeably with the terms "carrier aggregation" or "bandwidth aggregation or combination".

A multicarrier (i.e., a carrier aggregation) that is constructed by combining two or more component carriers (CCs) aims to support a bandwidth of up to 100 MHz in the LTE-A system. When one or more carriers having a smaller bandwidth than the target bandwidth are combined (or aggregated), bandwidths of the carriers to be combined may be limited to bandwidths that are used in the conventional IMT system in order to maintain backward compatibility with the conventional IMT system.

For example, the conventional 3GPP LTE system supports bandwidths of 1.4, 3, 5, 10, 15, and 20 MHz and the LTE-advanced (LTE_A) system can support a greater bandwidth than 20 MHz using only the bandwidths supported by the LTE system. In addition, the multicarrier system used in the present invention can also define a new bandwidth, regardless of the bandwidths used in the conventional system, to support carrier combination (i.e., carrier aggregation).

Figure 5A:
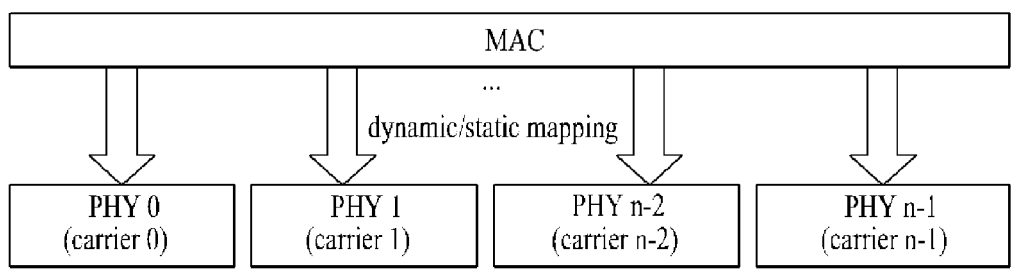
FIGS. 5(a) and 5(b) illustrate a method for transmitting and receiving signals based on multiband Radio Frequency (RF).
Figure 5B:
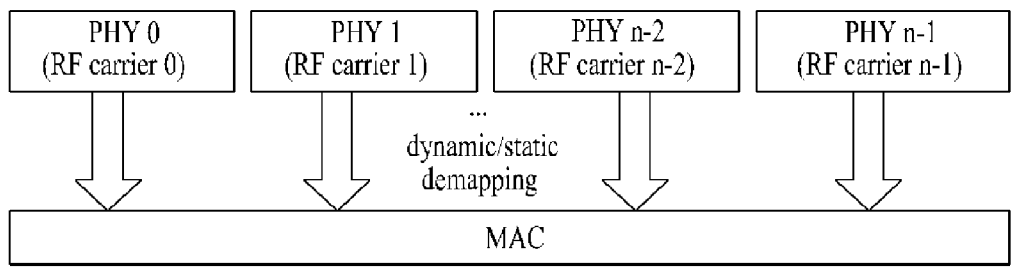

FIGS. 5(a) and 5(b) illustrate a method for transmitting and receiving signals based on multiband Radio Frequency (RF).

In an example of FIG. (5), one MAC layer of a transmitting end and a receiving end may manage a plurality of carriers in order to efficiently use multiple carriers. Here, it is assumed that both the transmitting end and the receiving end can transmit and receive multiple carriers in order to efficiently transmit and receive multiple carriers. Here, Frequency Carriers (FCs) managed by one MAC layer are flexible in terms of resource management since such FCs do not need to be contiguous to each other. That is, both contiguous aggregation and non-contiguous aggregation can be applied.

In FIGS. 5(a) and 5(b), PHY 0, PHY 1, . . . , PHY n−2, and PHY n−1 denote multiple bands according to the present technology and each of the bands may have the size of a frequency allocation band (FA) that is allocated for a specific service according to a predetermined frequency policy. For example, PHY 0 (RF carrier 0) may have the size of a frequency band allocated for a general FM radio broadcast and PHY 1 (RF carrier 1) may have the size of a frequency band allocated for mobile phone communication.

To transmit a signal through multiple bands as in the example of FIG. 5(a) and receive a signal through multiple bands as in the example of FIG. 5(b), it is necessary for both the transmitter and the receiver to include an RF module for transmitting and receiving a signal through multiple bands. In the example of FIG. 1, a method for configuring "MAC" is determined by the BS regardless of downlink or uplink.

Simply stated, the present technology is a technology in which one MAC entity (which will hereinafter be referred to as a "MAC" for short when this does not cause confusion) manages/operates a plurality of Radio Frequency (RF) carriers to transmit/receive signals. RF carriers managed by one MAC do not need to be contiguous to each other. Accordingly, the present technology has an advantage in that resource management is more flexible.

Figure 6A:
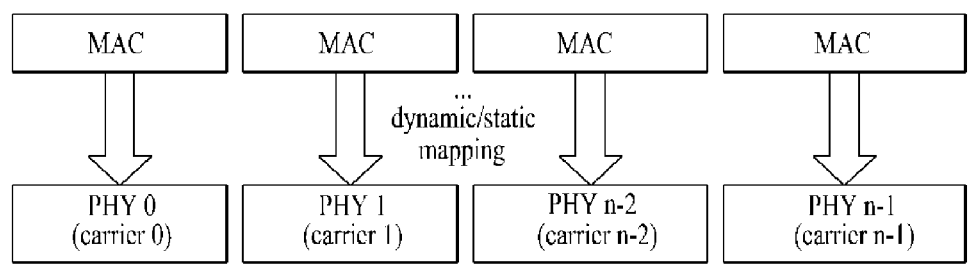
FIGS. 6(a) and 6(b) illustrate an exemplary method in which a plurality of MAC layers manages a plurality of carriers.
Figure 6B:
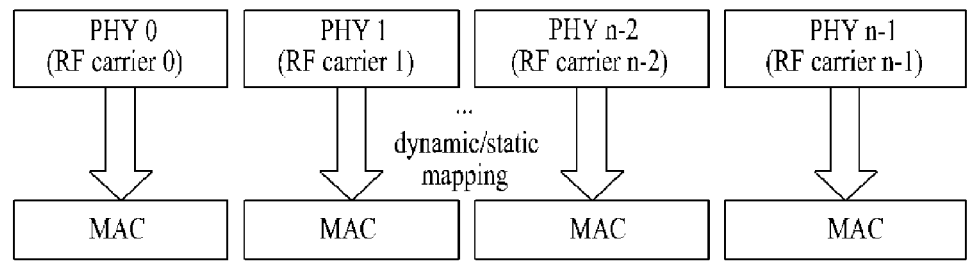

FIGS. 6(a) and 6(b) illustrate an exemplary method in which a plurality of MAC layers manages a plurality of carriers.

FIG. 6(a) shows a one-to-one mapping relationship between MAC layers and PHY layers when a transmitting end (BS) supports multiple carriers. FIG. 6(b) shows a one-to-one mapping relationship between MAC layers and PHY layers when a receiving end (UE) supports multiple carriers. Here, one PHY layer may use one carrier.

Figure 7A:
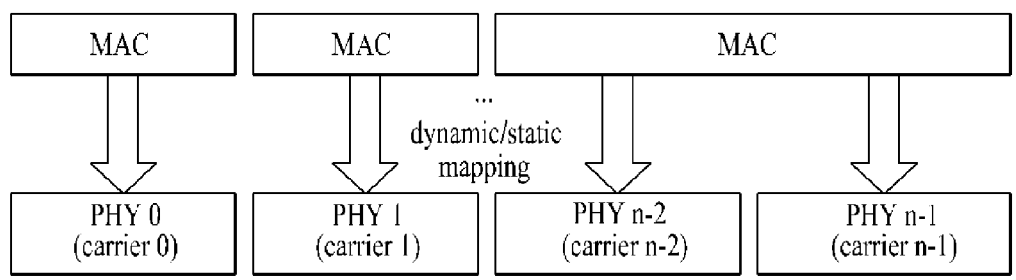
FIGS. 7(a) and 7(b) illustrate an exemplary method in which one MAC layer manages one or more carriers.
Figure 7B:
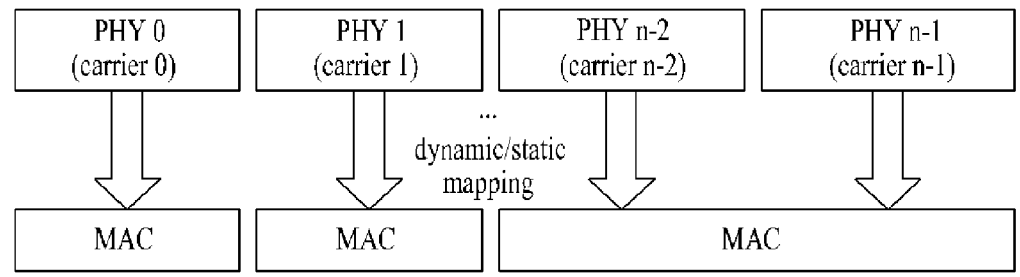

FIGS. 7(a) and 7(b) illustrate an exemplary method in which one MAC layer manages one or more carriers.

In the example of FIGS. 7(a) and 7(b), an independent MAC layer may be mapped to each PHY layer for specific carriers (carrier 0 and carrier 1) and one MAC layer may be mapped to physical layers (Carrier PHY) for one or more other specific carriers (carrier n−2 and carrier n−1). When this hybrid scheme is used, the multiplexing method of FIG. 6 may be used for some carriers in which one MAC is present for multiple PHY layers.

Specifically, FIG. 7(a) shows a 1-to-1 or 1-to-m (m>1) mapping relationship between MAC layers and PHY layers when the transmitting end (BS) supports multiple carriers. In addition, FIG. 7(b) shows a 1-to-1 or 1-to-m (m>1) mapping relationship between MAC layers and PHY layers when the receiving end (UE) supports multiple carriers.

In a system that supports multiple carriers, UEs may use different carriers according to capabilities of the UEs. However, the carrier band support capabilities of the BS may be fixed. The BS and the UE may perform negotiation as to whether to support carriers upon call setup according to the capabilities of the BS.

A TDD system is configured so as to operate N carriers while including DL and UL transmission regions in each carrier. An FDD system is configured such that a plurality of carriers can be used in uplink and downlink. An LTE Rel-8 system basically supports transmission and reception in a single carrier although uplink and downlink bandwidths can be set different. However, an LTE-A system can operate multiple carriers through carrier aggregation (carrier linkage or combination). In addition, the FDD system can support an asymmetric carrier combination scheme in which the bandwidths and/or the numbers of carriers combined in uplink and downlink are different.

An LTE-A UE disclosed in the present invention can simultaneously perform monitoring through one or more component carriers (CCs) according to the capabilities of the LTE-A UE. However, the LTE UE (for example, the LTE Rel-8 UE) can transmit and receive a radio signal through only one CC according to a CC structure provided by the LTE Rel-8 system. All CCs of LTE Rel-8 should be backward compatible, at least when the numbers of CCs combined in UL and DL are equal. LTE-A CCs are not limited in association with consideration of the non-backward-compatible structure.

The L1 (PHY) standard should support carrier combination for contiguous and non-contiguous component carriers including up to 110 RBs using the numerology of LTE Rel-8. For details of the frequency interval between each contiguous carrier in a contiguous carrier combination, reference can be made to RAN WG4 specifications. The RAN WG4 specifications provide details of the number of RBs supported per component carrier and guard bands required for a specific carrier combination. It is preferable that details of the RAN WG4 specifications also be applied to L1 specifications for a contiguous carrier combination and a non-contiguous carrier combination.

The UE may be configured to support a multicarrier which combines different numbers of component carriers in UL and DL so as to have different bandwidths in UL and DL. In a typical TDD arrangement, the numbers of bandwidths of component carriers in DL and UL and the numbers of component carriers in DL and UL may be equal. The RAN WG4 standard is expected to be studied so as to support component carrier and bandwidth combination.

From the viewpoint of the UE, it is possible to take into consideration one HARQ entity for each scheduled component carrier and one transmission block that has not been spatially multiplexed. Each transmission block may be mapped only to a single component carrier. The UE may be simultaneously scheduled on a plurality of component carriers.

Compatibility of LTE-A System

In the LTEA system, there are backward compatible carriers that support the conventional system (for example, the LTE system). Such carriers should be accessible by UEs corresponding to all LTE standards and should be operable as a single carrier or part of a multicarrier (or a carrier combination). In FDD, backward-compatible carriers are always present in pairs in DL and UL.

In the LTE-A system, there are non-backward-compatible carriers which do not support the conventional system. Such carriers can be used by LTE-A UEs although they cannot be used by the conventional LTE UEs. The non-backward-compatible carriers can each operate as a single carrier if the non-backward-compatible carriers are obtained from a duplex distance and can operate as a part of a carrier combination otherwise.

The LTE-A system can support an extended carrier. The extended carrier cannot operate as a single carrier. However, the extended carrier operates as a part of a component carrier set when at least one carrier in the component carrier set is a single carrier.

Cell-Specific Linkage and UE-Specific Linkage

In carrier aggregation, one or more carriers are used in two manners, a cell-specific manner and a UE-specific manner. In the present invention, the term "cell-specific", which is defined for ease of explanation, refers to carrier aggregation from the viewpoint of management by an arbitrary cell or BS. When the term "cell" is used to indicate a backward-compatible carrier or a non-backward-compatible carrier, the term "cell-specific" may be used for one or more carriers or resources (managed by an arbitrary BS) including one carrier that is expressed as a cell.

A cell-specific DL/UL aggregation (cell-specific DL/UL linkage) may take the form of a carrier aggregation configured by an arbitrary BS or cell. The cell-specific carrier aggregation may take a form in which a linkage of DL and UL is determined according to a preset default Tx-Rx separation specified in LTE Rel-8 and/or LTE-A in the case of FDD. For example, for details of default Tx-Rx separation in LTE Rel-8, reference can be made to sections 5.7.3 and 5.7.4 in the 3GPP TS 36.101 V8.8.0 specification. In addition, when a Tx-Rx separation is defined only for LTE-A, a cell-specific DL/UL linkage may be defined according to the corresponding linkage. For details of default Tx-Rx separation in LTE-A, reference can be made to sections 5.7.3 and 5.7.4 in the 3GPP TS 36.101 V10.0.0 specification.

A UE-specific multicarrier (UE-specific DL/UL linkage) structure sets a carrier aggregation form that can be used by a specific UE or UE group using an arbitrary method (for example, associated with UE capabilities, a negotiation procedure, a signaling procedure, broadcasting, or the like) that is applied to the BS and the UE. For example, UE-specific carrier aggregation defined in LTE-A includes a UE DL CC set and a UE UL CC set. The UE DL CC set which is a set of DL component carriers configured through dedicated signaling is scheduled in order to receive a PDSCH in downlink. The UE UL CC set is scheduled using UL component carriers in order to transmit a PUSCH in downlink. In the UE-specific carrier aggregation structure, CC sets such as a PDCCH monitoring set and a measurement set may be defined.

The PDCCH monitoring set may be configured within a UE DL CC set, separately from the UE DL/UL CC set, or may be configured in a form including a part of the UE DL CC set or may be configured for CCs different from those of the UE DL CC set. In addition, the PDCCH monitoring set may be configured in a UE-specific or cell-specific manner.

As carrier aggregation is introduced, the number of measurement results that should be reported by the UE increases according to the number of carriers combined with the measurement results. The measurement set may be defined in order to reduce overhead of measurement result reporting or in order to efficiently support measurement according to capabilities of each UE.

Methods for configuring a UE-specific multicarrier may be divided, according to flexibility, into (1) a configuration method in which a UE-specific multicarrier (DL/UL linkage) is arbitrarily configured regardless of the cell-specific multicarrier (DL/UL linkage) and (2) a configuration method in which a UE-specific multicarrier is configured within a range maintaining the structure of the cell-specific multicarrier.

Cross-Carrier Scheduling

A PDCCH structure and a DCI format defined in the LTE Rel-8 specifications do not support cross-carrier scheduling. That is, the same PDCCH transmission structure and DCI format (with the same coding method and the same CCE based resource mapping method) as those of conventional LTE Rel-8 are used without change. For example, a PDCCH in a component carrier allocates PDSCH resources to the same component carrier and allocates PUSCH resources to an associated UL component carrier. In this case, a Carrier Indicator Field (CIF) is not needed. In addition, the same associated PDSCH transmission, UL A/N, PUSCH transmission, and PHICH transmission methods as those of the LTE Rel-8 specifications are used.

The PDCCH structure and the DCI format defined in the LTE-A specifications can support cross-carrier scheduling. That is, a PDCCH (DL grant) and a PDSCH may be transmitted through different DL CCs or a PUSCH, which is transmitted according to a PDCCH (UL grant) transmitted in a DL CC, may be transmitted through a UL CC different from a UL CC which is linked with the DL CC in which the UL grant has been received. In this case, the PDCCH needs to include a carrier indicator field (CIF) that indicates a DL/UL CC through which a PDSCH/PUSCH indicated by the PDCCH is transmitted. For example, the PDCCH may allocate PDSCH or PUSCH resources to one of the multiple component carriers using the CIF. To accomplish this, the DCI format of the LTE-A system may be extended to the CFI of 1 to 3 bits and the PDCCH structure of LTE Rel-8 may be reused. In addition, according to cross-carrier scheduling, there may be a need to change PDSCH transmission, UL A/N, PUSCH transmission, and PHICH transmission in a manner different from the conventional system.

However, in the embodiments of the present invention, it is preferable that the number of blind decodings be reduced regardless of whether cross-carrier scheduling is supported.

Whether or not cross-carrier scheduling is permitted may be determined in a UE-specific, UE-group-specific, or cell-specific manner and activation of cross-carrier scheduling may be semi-statically toggled to reduce signaling overhead. It is possible to semi-statically set the size of the CIF according to whether cross-carrier scheduling is permitted or not (i.e., according to whether cross-carrier scheduling is activated or deactivated). This is similar to semi-static determination of the UE-specific transmission mode in LTE Rel-8.

When cross-carrier scheduling is deactivated, this indicates that the PDCCH monitoring set is always identical to the UE DL CC set. In this case, there is no need to provide an additional indication (such as signaling) of the PDCCH monitoring set. When cross-carrier scheduling is activated, it is preferable that the PDCCH monitoring set be defined in the UE DL CC set. In this case, there is a need to provide an additional indication (such as signaling) of the PDCCH monitoring set.

Method of Reducing the Number of Blind Decoding (BD)

Blind decoding indicates that the UE monitors a wireless search space in order to acquire control channel information such as PDCCH information.

The following Table 1 shows an exemplary relationship between the number of PDCCHs and the number of blind decodings in the LTE Rel-8 system.

TABLE 1

| | Aggregation level | # of candidate PDCCHs | |
|---|---|---|---|
| UE-specific SS | 1 | 6 | (6 + 6 + 2 + 2)·2 = 32 |
| | 2 | 6 | |
| | 4 | 2 | |
| | 8 | 2 | |
| Common SS | 4 | 4 | (4 + 2)·2 = 12 |
| | 8 | 2 | |

A UE supported in the LTE Rel-8 system should monitor a UE-specific Search Space (SS) and a common SS in order to decode a PDCCH. Accordingly, there is a need to perform blind decoding a total of 44 times.

The following Table 2 shows an exemplary DCI format according to a transmission mode used in the LTE Rel-8 system.

TABLE 2

| Transmission mode | DCI format to be monitored |
|---|---|
| 1. Single-antenna port; port 0 | DCI 0/1A, DCI 1 |
| 2. Transmit Diversity | DCI 0/1A, DCI 1 |

TABLE 2-continued

| Transmission mode | DCI format to be monitored |
|---|---|
| 3. Open-loop spatial Multiplexing | DCI 0/1A, DCI 2A |
| 4. Closed-loop spatial Multiplexing | DCI 0/1A, DCI 2 |
| 5. Multi-user MIMO | DCI 0/1A, DCI 1D |
| 6. Closed loop Rank = 1 precoding. | DCI 0/1A, DCI 1B |
| 7. Single-antenna port; port 5 | DCI 0/1A, DCI 1 |

The LTE UE can determine a DCI format to be monitored according to the transmission mode with reference to Table 2.

Blind decoding of the UE is determined according to the following three factors.

(1) The total number of CCE aggregation levels to be monitored (for example, 4 in Rel-8)

(2) The number of candidate PDCCHs to be monitored (for example, 4 in Rel-8)

(3) The number of DCI formats to be monitored (for example, 2 in Rel-8)

When cross-carrier scheduling is not supported in a carrier aggregation (CA) (or multicarrier) environment, the UE has the same blind decoding overhead as the LTE Rel-8 system for each component carrier (CC). However, when cross-carrier scheduling is supported, the number of factors which cause blind decoding may be increased since a DL/UL grant may not only be transmitted through one CC but a PDCCH for cross-carrier scheduling may also be transmitted in other CCs.

Accordingly, as a method for reducing blind decoding in a carrier aggregation environment, it is possible to consider (1) a method of limiting CCE aggregation levels, (2) a method of limiting candidate PDCCHs, and (3) a method of adjusting (or adapting) the size of a DCI format.

However, since the CCE aggregation level is determined according to the coding rate for reliable PDCCH transmission, limiting the CCE aggregation levels may affect successful PDCCH decoding and therefore it is difficult to apply the CCE aggregation level limitation method in order to reduce the number of blind decodings.

Since candidate PDCCHs, which are a preliminary set of PDCCHs to be decoded by the UE, use a small region of a search space (SS) for component carriers, it is possible to reduce the number of blind decodings by limiting candidate PDCCHs. However, this method is inappropriate since it may increase PDCCH blocking.

Finally, the method of adjusting the size of the DCI format may be an excellent method for reducing the number of blind decodings. Here, it is assumed that the DCI format whose size has been adjusted is transmitted through a common search space. If a cell-specific search space is defined, the DCI format size adjustment method may be disadvantageous in terms of blind decoding. The following is a description of a method for adjusting the size of DCI payload according to an embodiment of the present invention.

Method of Adjusting DCI Size

A method for adjusting the size of DCI payload in order to reduce the number of blind decodings of a UE is described below in detail.

The following Table 3 shows an example of the size of payload per bandwidth and a transmission mode of DCI formats used in the LTE Rel-8 system.

TABLE 3

| DCI format | | Bandwidth (RBs) | | | | | |
|---|---|---|---|---|---|---|---|
| | | 6 | 15 | 25 | 50 | 75 | 100 |
| Format 0 | | 37 | 38 | 41 | 43 | 43 | 44 |
| Format 1 | | 35 | 39 | 43 | 47 | 49 | 55 |
| Format 1A | | 36 | 38 | 41 | 43 | 43 | 44 |
| Format 1B | 2Tx | 38 | 41 | 43 | 44 | 45 | 47 |
| | 4Tx | 41 | 43 | 44 | 47 | 47 | 49 |
| Format 1C | | 24 | 26 | 28 | 29 | 30 | 31 |
| Format 1D | 2Tx | 38 | 41 | 43 | 44 | 45 | 46 |
| | 4Tx | 41 | 43 | 44 | 47 | 47 | 49 |
| Format 2 | 2Tx | 47 | 50 | 55 | 59 | 61 | 67 |
| | 4Tx | 50 | 53 | 58 | 62 | 64 | 70 |
| Format 2A | 2Tx | 44 | 47 | 52 | 59 | 58 | 64 |
| | 4Tx | 46 | 49 | 54 | 61 | 61 | 66 |
| Format 3/3A | | 37 | 38 | 41 | 43 | 43 | 44 |

From Table 3, it can be seen that the size of DCI payload varies according to the DCI format and the bandwidth. In Table 3, the size of DCI payload is shown in bits.

If the size of DCI payload is adjusted to a single payload size, the UE may decode only one channel in the same search space. That is, the UE may perform decoding on a DCI having the same payload size only once and may perform only field checking of the payload. However, when the payload size of each DCI is different, there is a need to individually perform, for each DCI, blind decoding according to the size of payload of the DCI in order to detect the DCI.

Adjusting the size of the DCI format does not affect the possibility of PDCCH blocking and/or the reliability of the PDCCH. Therefore, it is preferable that DCI format size adjustment (or adaptation) be taken into consideration in the cross-carrier scheduling environment. Adjustment of the size of the DCI format according to the number of appropriate containers may satisfy the maximum number of blind decodings regardless of the number of component carriers that have been allocated in a UE-specific manner.

When the size of the DCI format is adjusted, there is a need to take into careful consideration factors that may change the size of the DCI format. For example, such factors include (1) a system bandwidth of each CC, (2) a transmission mode of each CC, (3) the number of antenna ports of each CC (for example, in the same transmission mode, the DCI size may change according to the number of antennas), and (4) introduction of a new DCI format.

In the LTE-A system, a system bandwidth, a transmission mode, and the number of antennas may be separately (or independently) allocated to the UE. Therefore, it is possible to consider full-ranged DCI format sizes (or a full range of DCI format sizes) including the largest unified DCI format sizes, regardless of the UE-specific CC conditions. When the full-ranged DCI format sizes are taken into consideration, DCI payload sizes may be classified into a specific number of containers (for example, 2 to 4 DCI sizes) over DCI formats taking into consideration all system bandwidths and all transmission modes.

In the case in which full-ranged DCI format size adjustment is applied, there is no scheduling restriction on UE-specific carrier allocation. That is, the UE may be scheduled with any system bandwidth and in any transmission mode. However, full-ranged DCI format size adaptation may cause excessive padding bit overhead. DCI coverage loss in some DCI formats is caused by the fact that a full range of DCI sizes (24-70 bits) are divided into a specific number of containers. For example, when the size of the DCI format is set to 70 bits in order to support the entire bandwidth in the case of DCI format 1C, there is a burden of having to add 46 padding bits to the 24-bit payload in order to adjust the 24-bit payload to 70 bits. Therefore, the present invention suggests a method for adjusting partial-ranged DCI format sizes (or a partial-range of DCI format sizes) for efficient size adjustment (or adaptation) as described below.

In the case in which partial-ranged DCI format size adjustment is applied, a reasonable number of containers should be carefully determined. The number of blind decodings increases as the number of containers increases. A correct number of containers may be determined according to the maximum allowable number of blind decodings in the LTE-A system. If about 100 blind decodings are allowed in the LTE-A system (44 blind decodings in LTE Rel-8), it will be reasonable that 2 or 3 containers be used in order to avoid unnecessary blind decoding.

The following is a description of methods for limiting the range of DCI payload in the partial-ranged DCI format size adjustment method.

1. Method of Excluding DCI Formats Transmitted in Common SS when DCI Format Size Adjustment is Performed Basically, when DCI format size adjustment is performed, DCI payload sizes may be adjusted only for DCI formats which are transmitted through a UE-specific search space (SS), excluding DCI formats which are transmitted through a common SS.

DCI formats transmitted through the common SS include DCI format 1C and DCI format 3/3A as shown in Table 3. As can be seen from Table 3, the payload size of format 1C may be much smaller than other formats and padding bits may be added to the payload. However, this may significantly increase overhead of padding bits. In addition, size adjustment through RA compression may affect scheduling restriction (or limitation) since the RA field of other formats is excessively compressed. Accordingly, DCI formats which are transmitted through a common SS such as DCI format 1C and DCI format 3/3A may be excluded from the DCI formats for DCI payload size adjustment.

In addition, the DCI formats transmitted through the common SS and the DCI formats transmitted through the UE-specific SS cannot always share the SSs and adjustment of the size of the DCI payload may be meaningless since the purposes of use of the DCI formats transmitted through the common SS and the DCI formats transmitted through the UE-specific SS are different.

Here, the DCI formats transmitted through the common SS do not include a DCI format 0/1A which can be transmitted through the common SS. The DCI formats transmitted through the common SS which are handled in the present invention include only DCI formats such as the DCI format 1C and the DCI format 3/3A which can be transmitted through only the common SS.

The method of excluding DCI formats used in the common SS may also be applied to other DCI payload size adjustment methods described below.

2. Method of Adjusting Payload Sizes of DCI Formats which Slightly Change in the Payload Sizes for Each Bandwidth when DCI Format Size Adjustment is Performed The DCI payload size of each DCI format may vary depending on the bandwidth due to fields (for example, an RA field and a resource allocation field) which vary depending on the bandwidth. Although the payload size of each DCI format varies according to the bandwidth, some DCI formats slightly change in the payload size according to the bandwidth. Examples of such DCI formats include DCI format 0, DCI format 1A, DCI format 1B, and DCI format 1D.

The DCI format 0/1A has a payload difference of up to 7 bits as the bandwidth varies and has a payload difference of up to 8 bits as the bandwidth changes. In this case, even when the size of each DCI format is adjusted to the size of a DCI format corresponding to the largest bandwidth, overhead due to addition of padding bits to each DCI payload may be small.

For example, the payload size of the DCI format 0/1A may always be adjusted to a DCI size of 44 bits which is the DCI size of the largest bandwidth 100 MHz. In addition, the payload size of the DCI format 1B/1D may always be adjusted to a DCI size of 46 bits (in the case of 2Tx) or 49 bits (in the case of 4Tx) which is the DCI size of the largest bandwidth 100 MHz.

3. Method of Adjusting Payload Sizes of DCI Formats which Greatly Change in the Payload Sizes According to the Bandwidth Through Bandwidth Grouping when DCI Format Size Adjustment is Performed Contrary to configuration 0/1A/1B/1D, the DCI format 1/2/2A has a relatively great difference of up to 20 bits between payload sizes of bandwidths. Accordingly, adjusting the sizes of DCI formats according to the greatest bandwidth as in the DCI format 0/1A/1B/1D is undesirable since it may significantly increase padding overhead in the case of a small bandwidth.

Therefore, DCI payload size adjustment may be performed, through bandwidth grouping. For example, bandwidths may be grouped into two groups {6, 15, 25} RBs and {50, 75, 100} RBs. For example, in the case of DCI format 2 (in the case of 2Tx), DCI payload sizes may be adjusted to 55 bits and 67 bits.

Such DCI size adjustment through bandwidth grouping may be performed using the same bandwidth grouping for all DCI formats or may be performed using grouping optimized for each DCI format. Here, grouping optimized for each DCI format means that, when DCI size adjustment is performed using bandwidth grouping, bandwidth grouping may be performed so as to decrease the difference between the smallest DCI payload size and the largest DCI payload size.

In the embodiments of the present invention, bandwidth grouping is suitable for the case in which cross-carrier scheduling is activated while multiple component carriers allocated to a UE have different bandwidths.

The following Table 4 shows an example of bandwidth grouping in the case of DCI format 0/1A.

TABLE 4

| BW (RBs) | 6, 15 | 25, 50, 75, 100 |
|---|---|---|
| Max. pay load difference [adapted payload size] | 1 bit[38 bits] | 3 bits[44 bits] |

From Table 4, it can be seen that the maximum difference between the payload sizes of DCI formats is 1 bit when the bandwidths are 6 RBs and 15 RBs and is 3 bits when the bandwidths are 25 RBs, 50 RBs, 75 RBs, and 100 RBs. Thus, DCI payload size adjustment may be performed for each group of bandwidths.

The following Table 5 shows an example of bandwidth grouping in the case of DCI format 1.

TABLE 5

| BW (RBs) | 6, 15, 25 | 50, 75, 100 |
|---|---|---|
| Max. payload difference [adapted payload size] | 8 bits[43 bits] | 8 bits[55 bits] |

The following Table 6 shows another example of bandwidth grouping in the case of DCI format 1.

TABLE 6

| Bw (RBs) | 6, 15 | 25, 50 | 75, 100 |
|---|---|---|---|
| Max. payload difference [adapted payload size] | 4 bits[39 bits] | 4 bits[47 bits] | 6 bits[55 bits] |

Unlike Table 5, Table 6 shows the case in which bandwidths are divided into three groups for DCI format 1.

The following Table 7 shows an example of bandwidth grouping in the case of 2Tx for DCI format 1B/1D and Table 8 shows an example of bandwidth grouping in the case of 4Tx.

TABLE 7

| BW (RBs) | 6, 15 | 25, 50, 75, 100 |
|---|---|---|
| Max. pay load difference [adapted payload size] | 3 bits[41 bits] | 3 bits[46 bits] |

TABLE 8

| BW (RBs) | 6, 15, 25 | 50, 75, 100 |
|---|---|---|
| Max. pay load difference [adapted payload size] | 3 bits[44 bits] | 3 bits[49 bits] |

In the examples of Tables 7 and 8, bandwidths are grouped differently depending on the number of antennas in DCI format 1B/1D. However, in the case of 2Tx and 4Tx, bandwidth grouping may be performed according to 4Tx regardless of the number of transmission antennas since the maximum difference between payload sizes thereof is 3 bits. In this case, in the example of Table 7, the DCI sizes may be adjusted through {6, 15, 25} RBs and {50, 75, 100} RBs as in the example of Table 8.

The following Table 9 shows an example of bandwidth grouping in the case of 2Tx for DCI format 2.

TABLE 9

| BW (RBs) | 6, 15, 25 | 50, 75, 100 |
|---|---|---|
| Max. pay load difference [adapted payload size] | 8 bits[55 bits] | 8 bits[67 bits] |

The following Table 10 shows another example of bandwidth grouping in the case of 2Tx for DCI format 2.

TABLE 10

| | BW (RBs) | | |
|---|---|---|---|
| | 6, 15 | 25, 50 | 75, 100 |
| Max. payload difference[adapted payload size] | 3 bit[50 bits] | 4 bit[59 bits] | 6 bit[67 bits] |

The following Table 11 shows an example of bandwidth grouping in the case of 4Tx for DCI format 2.

TABLE 11

| | BW (RBs) | |
|---|---|---|
| | 6, 15, 25 | 50, 75, 100 |
| Max. payload difference[adapted payload size] | 8 bits[58 bits] | 8 bits[70 bits] |

The following Table 12 shows another example of bandwidth grouping in the case of 4Tx for DCI format 2.

TABLE 12

| | BW (RBs) | | |
|---|---|---|---|
| | 6, 15 | 25, 50 | 75, 100 |
| Max. payload difference[adapted payload size] | 3 bit[53 bits] | 4 bit[62 bits] | 6 bit[70 bits] |

The following Table 13 shows an example of bandwidth grouping in the case of 2Tx for DCI format 2A.

TABLE 13

| | BW (RBs) | |
|---|---|---|
| | 6, 15, 25 | 50, 75, 100 |
| Max. payload difference[adapted payload size] | 8 bits[52 bits] | 7 bits[64 bits] |

The following Table 14 shows another example of bandwidth grouping in the case of 2Tx for DCI format 2A.

TABLE 14

| | BW (RBs) | | |
|---|---|---|---|
| | 6, 15 | 25, 50 | 75, 100 |
| Max. payload difference[adapted payload size] | 3 bit[47 bits] | 5 bit[57 bits] | 6 bit[64 bits] |

The following Table 15 shows an example of bandwidth grouping in the case of 4Tx for DCI format 2A.

TABLE 15

| | BW (RBs) | |
|---|---|---|
| | 6, 15, 25 | 50, 75, 100 |
| Max. payload difference[adapted payload size] | 8 bits[54 bits] | 8 bits[66 bits] |

The following Table 16 shows another example of bandwidth grouping in the case of 4Tx for DCI format 2A.

TABLE 16

| | BW (RBs) | | |
|---|---|---|---|
| | 6, 15 | 25, 50 | 75, 100 |
| Max. payload difference[adapted payload size] | 3 bit[49 bits] | 4 bit[58 bits] | 5 bit[66 bits] |

In the examples of Tables 9 to 16, bandwidths are grouped differently depending on the number of antennas in DCI format 2/2A. However, in the case of 2Tx and 4Tx, bandwidth grouping may be performed according to 4Tx regardless of the number of transmission antennas since the maximum difference between payload sizes thereof is 3 bits. Here, in the case of 2Tx, the DCI payload sizes may be adjusted through bandwidth grouping into a group of {6, 15, 25} RBs and a group of {50, 75, 100} RBs.

In the embodiments of the present invention, for DCI formats other than DCI formats 0/1A/1B/1D which have a small difference between DCI payload sizes, DCI size adjustment may be performed through bandwidth grouping regardless of the size of DCI payload.

For example, the payload size difference between DCI formats of bandwidths corresponding to {6, 15} RBs and {50, 75} RBs is small. Therefore, DCI sizes of DCI formats of such bandwidths may be adjusted according to 15 RBs and 75 RBs.

However, the difference between payload sizes of bandwidths corresponding to {15, 25} RBs and {75, 100} RBs is great for some DCI formats and therefore the corresponding DCI sizes may be directly used. Specifically, bandwidths may be grouped into groups of {6, 15}, {25}, {50, 75}, and {100} RBs to adjust the DCI payload sizes. In this case, if adjustment of the DCI sizes by adding about 8 or 9 padding bits to the DCI payload is not too inefficient, bandwidths may be grouped into {6, 15, 25} RBs and {50, 75, 100} RBs to perform DCI size adjustment.

4. Method of Adjusting DCI Size According to Transmission Mode when DCI Format Size Adjustment is Performed The method of adjusting DCI sizes for each transmission mode is performed in the following manner. DCI formats 1/1A/1B/1D have similar payload sizes within the same bandwidth. In addition, DCI formats 2 and 2A have similar payload sizes within the same bandwidth. Therefore, DCI format size adjustment may be performed according to the types of the DCI formats. For example, payload size adjustment may be performed for DCI formats of DCI format-1 types and payload size adjustment may be performed for DCI formats of the DCI format-2 types.

However, the payload size difference between the DCI format-1 types and the DCI format-2 types is significantly greater than the difference between DCI-1 types (excluding DCI format 1C) and the difference between DCI-2 types. For example, the maximum payload size difference between DCI format-1 types within the same bandwidth is 4 or 5 bits and the maximum payload size difference between DCI format-2 types within the same bandwidth is 4 to 6 bits. However, the payload size difference between DCI format-1 types and DCI format-2 types within the same bandwidth may be up to 26 bits. Thus, when DCI payload size adjustment is performed according to the transmission mode, it may be preferable that payload size adjustment be performed only for DCI format-1 types and payload size adjustment be performed only for DCI format-2 types. Otherwise, great padding overhead may occur due to addition of padding bits when payload size adjustment is performed for both DCI format-1 types and DCI format-2 types.

The following is a description of a method for adjusting DCI payload sizes using bandwidth grouping and the transmission mode of the UE.

For relatively small bandwidths {6, 15, 25, 50} RBs, the DCI format 0/1A and the DCI format 1 exhibit a relatively small payload size difference of up to 4 bits as the bandwidth increases. However, for relatively great bandwidths {75, 100} RBs, the DCI format 0/1A and the DCI format 1 exhibit a great payload size difference of up to 11 bits.

In some cases, a UE may have to simultaneously monitor the DCI format 0/1A and the DCI format 1 according to the DCI format for UL grant reception and the transmission mode. In such cases, it is possible to perform payload size adjustment of the two DCI formats only for relatively small bandwidths without performing payload size adjustment of the two DCI formats for relatively large bandwidths. For example, it is possible to perform payload size adjustment for bandwidths of {6, 15, 25, 50} RBs or {6, 15, 25} RBs.

If payload size adjustment is performed for both a format having a small difference between payload sizes of bandwidths and a format having a small difference between payload sizes of bandwidths, for example, for the DCI format 0/1A and the DCI format 1, added padding overhead may be significantly increased when configuring one container according to each bandwidth allocated to the UE. Therefore, size adjustment may be performed on DCI formats for each transmission mode only for the case in which the DCI formats have a small payload size difference according to the bandwidth.

For example, the DCI format 0 and the DCI format 1A have the same payload size. In addition, the DCI format 1B and the DCI format 1D have the same payload size. In this case, it is preferable that, when the UE needs to monitor DCI formats 0, 1A, 1B, and 1D according to the transmission mode allocated to the UE, payload sizes of the DCI format 0 and the DCI format 1A be adjusted to the payload sizes of the DCI format 1B and the DCI format 1D.

However, when bandwidths are not taken into consideration when payload size adjustment is performed for transmission modes, padding overhead may be increased as described above. Accordingly, it is preferable that bandwidths be taken into consideration when payload size adjustment is performed for the DCI format (0/1A) and the DCI format (1B/1D).

The following Table 17 illustrates an example in which payload size adjustment is performed for the DCI format 0/1A and the DCI format 1B/1D (2Tx).

TABLE 17

| | BW (RBs) | |
|---|---|---|
| | 6, 15, 25 | 50, 75, 100 |
| Max. payload difference[adapted payload size] | 6 bits[43 bits] | 3 bits[46 bits] |

The following Table 18 illustrates another example in which payload size adjustment is performed for the DCI format 0/1A and the DCI format 1B/1D (2Tx).

TABLE 18

| | BW (RBs) | |
|---|---|---|
| | 6, 15 | 25, 50, 75, 100 |
| Max. payload difference[adapted payload size] | 4 bit[41 bits] | 5 bit[46 bits] |

The following Table 19 illustrates an example in which payload size adjustment is performed for the DCI format 0/1A and the DCI format 1B/1D (4Tx).

TABLE 19

| | BW (RBs) | |
|---|---|---|
| | 6, 15, 25 | 50, 75, 100 |
| Max. payload difference[adapted payload size] | 7 bits[44 bits] | 6 bits[49 bits] |

The following Table 20 illustrates another example in which payload size adjustment is performed for the DCI format 0/1A and the DCI format 1B/1D (4Tx).

TABLE 20

| | BW (RBs) | |
|---|---|---|
| | 6, 15 | 25, 50, 75, 100 |
| Max. payload difference[adapted payload size] | 6 bit[43 bits] | 8 bit[49 bits] |

The DCI formats 1B/1D have a difference between the payload size in the case of 2Tx and the payload size in the case of 2Tx. Here, when the payload sizes of the DCI formats 1B and 1D are adjusted to the payload size in the case of 4Tx, the payload size of the DCI formats 1/1A may also be adjusted to the payload size in the case of 4Tx of the DCI formats 1B/1D.

Payload size adjustment may also be performed for DCI format-2 types. For example, payload size adjustment is performed for the DCI format 2 and the DCI format 2A in the following manner. The payload size of the DCI format 2 is always greater than the payload size of the DCI format 2A. When comparison is made according to the number of antennas, the maximum difference between the payload sizes of the DCI format 2 and the DCI format 2A is 3 bits in the case of 2Tx and 4 bits in the case of 4Tx. In this case, when the UE needs to monitor the DCI format 2A according to the transmission mode, the UE can always use a DCI format whose payload size has been adjusted to the payload size of the DCI format 2.

In the case of DCI format-2 types, payload size adjustment may be performed taking into consideration the bandwidth, similar to payload size adjustment of DCI format-1 types. The following Table 21 illustrates an example of a method for performing payload size adjustment for the DCI format 2 and the DCI format 2A (2Tx).

TABLE 21

| | BW (RBs) | |
| --- | --- | --- |
| | 6, 15, 25 | 50, 75, 100 |
| Max. payload difference[adapted payload size] | 11 bits[55 bits] | 10 bits[67 bits] |

The following Table 22 illustrates another example of a method for performing payload size adjustment for the DCI format 2 and the DCI format 2A (2Tx).

TABLE 22

| | BW (RBs) | | |
| --- | --- | --- | --- |
| | 6, 15 | 25, 50 | 75, 100 |
| Max. payload difference[adapted payload size] | 6 bit[50 bits] | 7 bit[59 bits] | 9 bit[67 bits] |

The following Table 23 illustrates an example of a method for performing payload size adjustment for the DCI format 2 and the DCI format 2A (4Tx).

TABLE 23

| | BW (RBs) | |
| --- | --- | --- |
| | 6, 15, 25 | 50, 75, 100 |
| Max. payload difference [adapted payload size] | 12 bits[58 bits] | 12 bits[70 bits] |

The following Table 24 illustrates another example of a method for performing payload size adjustment for the DCI format 2 and the DCI format 2A (4Tx).

TABLE 24

| | BW (RBs) | | |
| --- | --- | --- | --- |
| | 6, 15 | 25, 50 | 75, 100 |
| Max. payload difference[adapted payload size] | 7 bit[53 bits] | 8 bit[62 bits] | 9 bit[70 bits] |

Tables 4 to 24 show the maximum difference between payload sizes of DCI formats for each bandwidth group. In this case, the payload sizes of DCI formats may be adjusted to the payload size of a DCI format which has the largest payload size in each bandwidth group. Bit values in square brackets in the above tables show the adjusted payload sizes of DCI formats.

5. Method of Adjusting Sizes of DCI Formats According to the Number of Antennas

The sizes of some DCI formats (for example, DCI formats 1B/1D/2/2A) may change according to the number of transmission antennas of the UE. In this case, the sizes of the DCI formats may be adjusted according to the number of antennas.

For example, the payload sizes of the DCI formats 1B/1D when the number of transmission antennas is 2 (2Tx) and when the number of transmission antennas is 3 (3Tx) have a difference of up to 3 bits. Therefore, the sizes of the DCI formats may be adjusted to the size of the DCI payload of 4Tx. The payload sizes of the DCI formats 2/2A also have a difference of up to 3 bits according to the number of antennas and therefore overhead due to addition of padding bits is small. Accordingly, DCI payload sizes may be adjusted to the sizes of the DCI formats in the case of 4Tx, regardless of the number of antennas.

Method of Reducing the Number of Blind Decodings Using Format Indicator for LTE-A UE in the Case of DCI Formats Having the Same Payload Size The payload sizes of the DCI formats 1B and 1D are equal. In this case, the present invention suggests that LTE-A UEs share a search space (SS) in which such DCI formats can be transmitted such that the DCI formats are transmitted through the same SS and received DCI formats be discriminated using a Format Indication Flag (FIF).

To accomplish this, a 1-bit FIF, which is not defined in LTE Rel-8, may be included in the DCI formats 1B/1D. Alternatively, CRC masking may be specified to be used differently for each DCI format for DCI format identification.

Under the assumption that the LTE-A UE has acquired information such as a bandwidth, a transmission mode, and the number of antennas of each of multiple component carriers allocated to the UE through higher layer signaling, the transmission mode of each downlink component carrier (DL CC) may be specified differently for each DL CC when cross-carrier scheduling is performed and, through a Carrier Indicator Field (CIF) incorporated when cross-carrier scheduling is performed, the UE can determine a DL CC through which the corresponding PDCCH transmits a scheduling grant. That is, the FIF may be replaced with the CIF.

Both UE-specific DCI size adjustment and cell-specific DCI size adjustment may be applied. That is, DCI format size adjustment methods may be provided in a UE-specific manner or a cell-specific manner. The following is a description of a method for adjusting DCI format sizes in a UE-specific manner.

The UE-specific partial-ranged DCI format size adjustment method is performed for DCI formats allocated to the UE. That is, in this method, DCI format size adjustment is performed for DCI formats that need to be monitored according to the number of CCs actually allocated to the UE, a bandwidth of each CC, a transmission mode of each CC, and the number of transmission antennas of the UE. When UE-specific size adjustment is performed, DCI format sizes may be adjusted based on the methods suggested above.

Even when payload size adjustment is performed on DCI formats such as DCI formats 0/1A and DCI format 1B/1D which can always be adjusted to DCI sizes of the maximum bandwidth of 100 MHz, the UE-specific size adjustment method can perform payload size adjustment only for reference DCI formats according to the bandwidths, transmission modes, and transmission antennas of multiple CCs allocated to the UE. For example, when bandwidths of one or more CCs allocated to the UE include 25 RBs and 50 RBs, the corresponding payload sizes may be adjusted to a DCI size of a bandwidth corresponding to 50 RBs.

In addition, a UE in which cross-carrier scheduling has been activated may sub-group UE DL CCs according to linkage (or association) between PDCCH monitoring CCs and scheduling CCs in a PDCCH monitoring CC set and a UE DL CC set and may apply a DCI size adjustment method according to the configuration state of the sub-grouped DL CCs.

Figure 8A:
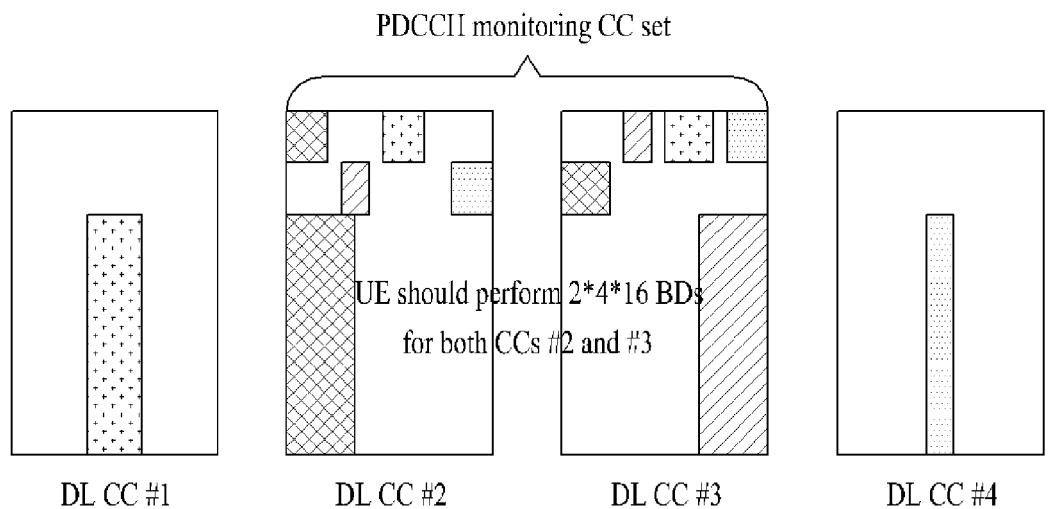
FIGS. 8(A) and 8(B) illustrate a relationship between monitoring CCs and scheduled CCs according to an embodiment of the present invention.
Figure 8B:
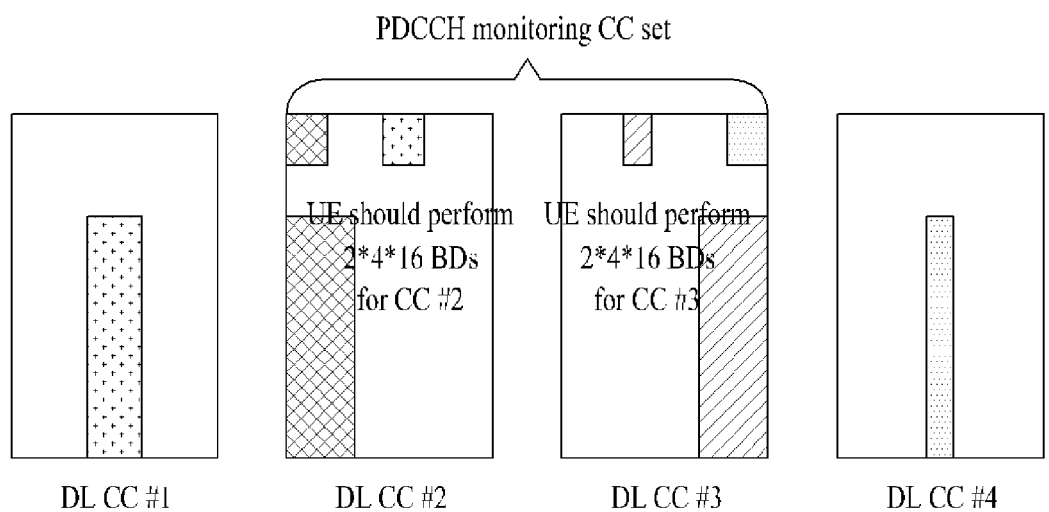

FIGS. 8(A) and 8(B) illustrate a relationship between monitoring CCs and scheduled CCs according to an embodiment of the present invention.

When cross-carrier scheduling has been activated in combination with the PDCCH monitoring CC set and the LTE Rel-8 DCI format, the maximum number of blind decodings for PDSCH may be calculated as about M*N*16. Here, M denotes the number of DL CCs of the PDCCH monitoring set and N denotes the number of scheduled DL CCs of the PDCCH monitoring set.

FIG. 8(A) shows four DL CCs for PDSCH scheduling and two PDCCH monitoring sets in the case in which there is no linkage (or association) between the PDCCH monitoring CC set and the CCs scheduled for the UE. In this case, the UE needs to perform blind decoding on PDCCH monitoring CCs #2 and #3 in order to decode all PDCCHs for PDSCHs included in DL CCs #1, #2, #3, and #4. That is, the total number of blind decodings is 128 (=2*4*16).

On the other hand, FIG. 8(B) shows the case in which there is a linkage between a PDCCH monitoring CC set and CCs scheduled for the UE. For example, the monitoring CC #2 is scheduled together with the DL CCs #1 and #2 scheduled for the UE and the monitoring CC #3 is scheduled together with the DL CCs #3 and #4. In this case, the total number of blind decodings which are to be performed by the UE is 64 (=2*16+2*16). The number of blind decodings in the case of FIG. 8(B) is reduced compared to that of FIG. 8(A). Therefore, there is a need to define a certain degree of linkage (or association) in order to reduce the number of blind decodings of the UE and complexity of the UE.

When such a method is used, in the PDCCH monitoring CC #2, the UE may adjust payload sizes of DCI formats that can be transmitted through DL CCs #1 and #2 under a CC configuration of the DL CC #1 and a CC configuration of the DL CC #2.

The following is a description of a method for adjusting DCI format sizes in a cell-specific manner.

The cell-specific DCI format size adjustment method may be applied to all possible DCI formats regardless of the UE-specific CC configuration. In the cell-specific DCI format size adjustment method, DCI size adjustment is not determined according to a CC configuration allocated to each UE but instead each UE uses DCI formats having a preset size in a state in which a size adjustment method for a specific DCI format has been determined.

An appropriate number of containers may be configured by adjusting the sizes of DCI formats. Here, the relationship between the number of containers, the number of blind decodings, and the number of padding bits when padding bits are used when payload size adjustment is performed is described as follows:

- As the number of containers increases, the maximum number of blind decodings increases linearly with a given CCE aggregation level and the total number of SSs.
- On the other hand, as the number of containers increases, the granularity (or capacity) of given DCI format sizes, which is the capability to include given DCI format sizes, increases and therefore it is possible to reduce the number of padding bits.
- If the number of DCI formats for which bandwidth grouping is to be performed is reduced, the amount of change in the number of DCI formats is likely to be reduced accordingly, thereby achieving an advantage in that it is possible to reduce the number of padding bits for a given container size.
- On the other hand, if the number of DCI formats for which bandwidth grouping is to be performed is reduced, the number of blind decodings may be increased since there is a need to perform additional blind decodings for the excluded DCIs (or DCI formats).

Uplink DCI Size Adjustment Method

As shown in Tables 2 and 3, the LTE Rel-8 UE is configured to always monitor a DCI format 1A used for dynamic fallback and a DCI format (for example, one of the DCI formats 1, 2A, 2, 1B, and 1D) corresponding to a transmission mode which is configured through RRC signaling in order to search for a DL grant destined for the LTE Rel-8 UE.

In the LTE Rel-8 system, the payload size of DCI format 1A is equal to the payload size of DCI format 0 which is the UL grant format. That is, the DCI format 1A and the DCI format 0 are designed so as to support dynamic fallback (an alternative system) without additional blind decoding overhead and the UE can detect the DCI format 1A and the DCI format 0 together through blind decoding.

The LTE UE monitors the DCI format 0 in order to search for the UL grant allocated to the LTE UE. Unlike the LTE Rel-8 system, in the LTE-A system, additional transmission modes for uplink such as a mode that uses UL SU-MIMO (MCW) and a mode that uses UL non-contiguous resource allocation may be defined in addition to the conventional (or legacy) uplink transmission modes. In addition, a new UL DCI format may be defined in addition to the DCI format 0 which is the only conventional DCI format in order to support such transmission modes and such new resource allocation schemes.

For example, the following UL DCI formats may be defined as UL grant formats that can be defined in the LTE-A system. For example, (1) DCI 0: conventional UL grant, (2) DCI 0A: non-contiguous resource allocation, and (3) DCI 0B: DCI for uplink SU/MU MIMO may be defined in the LTE-A system.

As new transmission modes and new resource allocation methods are introduced in the LTE-A system, there may be a need to use dynamic fallback in uplink. The term "dynamic fallback" refers to a procedure in which each UE monitors DCI format 1A as an alternative DCI format in addition to a DCI format corresponding to a transmission mode configured for the UE in downlink of the LTE Rel-8 system. UL dynamic fallback is such dynamic fallback applied to UL. Using UL dynamic fallback, it is possible to increase reliability of PDCCH transmission in an interval in which there is transition ambiguity when the transmission mode is changed. In addition, it is possible to guarantee reliable transmission of the PDCCH in a worsened channel condition.

In the LTE-A system, the DCI format 0 which is the conventional UL grant format may be set to be used as a DCI format for such UL dynamic fallback. Since the DCI format 0 is set to be used as a DCI format for UL dynamic fallback, there is no need to generate a new payload for fallback and the number of blind decodings required for the UE is not increased.

In an LTE-A multicarrier (carrier aggregation) environment, a bandwidth or a transmission mode of each CC the multiple carriers may be configured independently. When the bandwidths of one or more DL/UL CCs allocated to a specific UE (for example, information such as a UE DL CC set transmitted for UE-specific carrier allocation through UE-specific RRC signaling) are different, the DCI size of the DCI format 0 used for UL dynamic fallback may be different for each bandwidth. When the UE monitors DCI formats for different transmission modes in UL CCs, the UE may monitor respective monitoring DCI formats of UL transmission modes that are configured through RRC signaling, similar to DCI format monitoring in DL.

In the embodiments of the present invention, it is assumed that the UE has already acquired information regarding a grant DCI to be monitored according to a transmission mode of each UL CC through RRC signaling. In addition, it is assumed that bandwidths of UL CCs allocated to the UE are different.

Here, in the case in which cross-carrier scheduling is used for LTE-A multiple carriers such that the UE monitors one or more UL grants in one DL CC (which is a PDCCH monitoring DL CC), the bandwidths of the CCs are different and therefore the PDCCH payload size of the DCI format 0 to be monitored as a DCI format for fallback in one DL CC varies according to the bandwidth.

For example, when it is assumed that 2 DL CCs and 2 UL CCs (or a DL/UL symmetric carrier aggregation) are allocated to an arbitrary LTE-A UE and one DL/UL CC pair has a bandwidth of 20 MHz and the other DL/UL CCs has a bandwidth of 10 MHz, the payload size of UL DCI 0 that is to be monitored through UL fallback varies depending on the bandwidth such that the payload size is 43 bits given a bandwidth of 10 MHz and the payload size is 44 bits given a bandwidth of 20 MHz.

The present invention provides a method for increasing scheduling flexibility of the grant for fallback and minimizing additional blind decoding overhead by (1) adjusting the DCI format size used for UL fallback to a uniform size regardless of the bandwidth and (2) allowing an SS, which transmits the size-adjusted DCIs, to be shared.

In the LTE-A system, it is assumed that the DCI format 0 is used as a DCI format for UL fallback. Here, the present invention can be applied to the DCI format 0/1A since the DCI format 0/1A has the same payload size.

In the embodiments of the present invention, the DCI format 0/1A may be used by adjusting the payload size of the DCI format to the DCI size of the maximum bandwidth. That is, UEs can always perform monitoring of a UL grant for fallback on the DCI format 0/1A corresponding to the bandwidth of 20 MHz, regardless of the bandwidth of the UL CC allocated to the UE. The UE and the BS can use padding bits in order to adjust the DCI payload size to the maximum bandwidth size.

The SS in which size-adjusted DCI formats for fallback are transmitted may be shared and used. Here, UL grants of each UL CC may be transmitted through an SS for a DL CC linked with each UL CC. A UL grant for scheduling of each transmission mode may be scheduled to be transmitted through the respective SS of each CC.

The DCI format 0/1A corresponding to the UL grant for UL fallback is also transmitted through the respective SS of each CC. When the UE searches for a UL grant for fallback of a specific CC, the UE searches for the UL grant for fallback in SSs of all UL CCs, which are to be monitored by the UE, rather than searching for the UL grant only in an SS corresponding to the specific CC.

It is preferable that the UE monitor the DCI format 0/1A for UL fallback of all CCs in SSs of all CCs allocated to the UE rather than limiting the SSs, in which the UL DCI format for fallback is to be monitored, to the individual SS of each CC.

Using the above methods, it is possible to provide sufficient scheduling flexibility of a grant for fallback without increasing blind decoding complexity for UL fallback monitoring since, even when the DCI payload size is not adjusted to that of the grant for fallback, all UEs will still perform the same number of blind decodings as that given for the grant for fallback.

Figure 9:
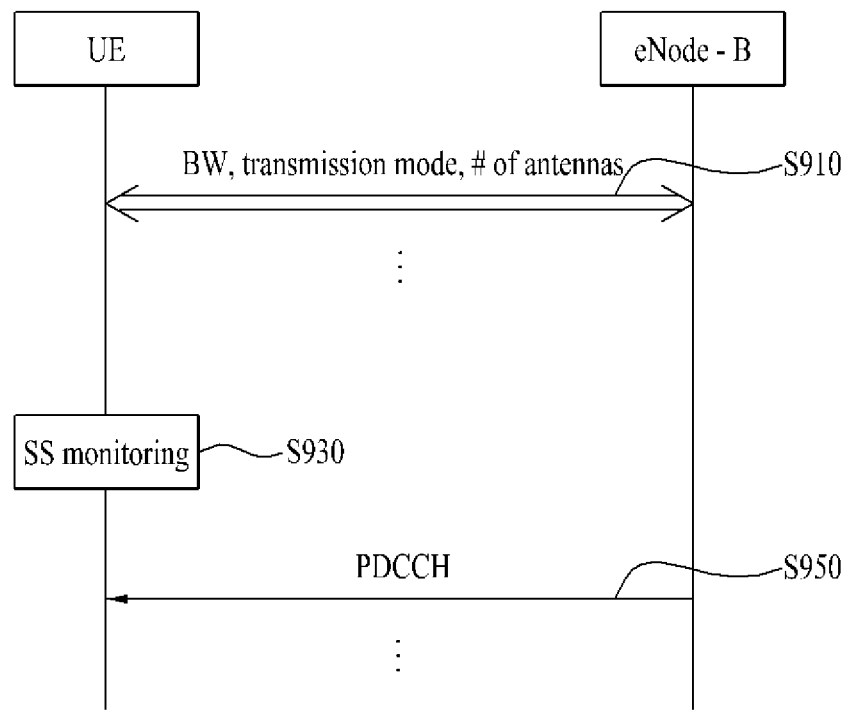
FIG. 9 illustrates a PDCCH transmission and reception method using a DCI format whose size has been adjusted in order to reduce the number of blind decodings of the UE according to an embodiment of the present invention.

FIG. 9 illustrates a PDCCH transmission and reception method using a DCI format whose size has been adjusted in order to reduce the number of blind decodings of the UE according to an embodiment of the present invention.

As shown in FIG. 9, the UE can acquire information regarding a bandwidth, a transmission mode, and the number of transmission antennas available for the UE through higher layer signaling, a negotiation procedure, a broadcast message, or the like provided from a BS (eNode-B) (S910).

The UE can monitor an SS allocated to the UE in order to receive DCI whose size has been adjusted through the various DCI payload size adjustment methods described above (S930).

The UE can recognize the size of a DCI format to be decoded by the UE based on at least one of the bandwidth, the transmission mode, and the number of transmission antennas of the UE allocated to the UE. Accordingly, the UE monitors the SS in order to perform blind decoding on the size-adjusted DCI in step S930.

The UE may receive a PDCCH from the eNode-B through the monitored SS (S950).

In the example of FIG. 9, the eNode-B may configure DCI, which is to be transmitted to the UE, through the various DCI payload size adjustment methods described in the above embodiments of the present invention. Of course, the size-adjusted DCI formats may already be known by the eNode-B and the UE. In addition, the UE can reduce the number of blind decodings by decoding the adjusted DCI formats using information regarding the bandwidth, the transmission mode, and the number of transmission antennas that have been acquired through a procedure such as higher layer signaling that is performed with the eNode-B.

Figure 10:
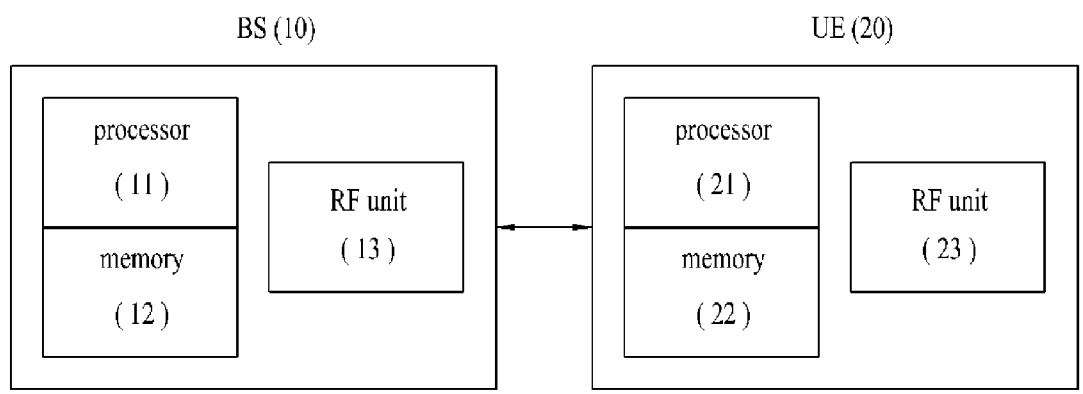
FIG. 10 illustrates an example of an apparatus, which supports the DCI size adjustment methods described in the present invention, according to an embodiment of the present invention.

FIG. 10 illustrates an example of an apparatus, which supports the DCI size adjustment methods described in the present invention, according to an embodiment of the present invention.

As shown in FIG. 10, a radio communication system may include one or more Base Stations (BSs) 10 and one or more User Equipments (UEs) 20. In downlink, a part of the BS 10 may operate as a transmitter and a part of the UE 20 may operate as a receiver. In uplink, a part of the UE 20 may operate as a transmitter and a part of the BS 10 may operate as a receiver.

The BS 10 may include a processor 11, a memory 12, and a radio frequency (RF) unit 13. The processor 11 may be configured so as to implement the procedures and/or methods suggested in the embodiments of the present invention. The memory 12 operates in conjunction with the processor 11 and stores various information handled in the processor. The RF unit 13 operates in conjunction with the processor 11 and transmits and receives radio signals.

The UE 20 may include a processor 21, a memory 22, and an RF unit 23. The processor 21 may be configured so as to implement the procedures and/or methods suggested in the embodiments of the present invention. The memory 22 operates in conjunction with the processor 21 and stores various information handled in the processor. The RF unit 23 operates in conjunction with the processor 21 and transmits and receives radio signals.

The BS 10 and/or the UE 20 may include a single antenna or multiple antennas. When at least one of the BS and the UE includes multiple antennas, the radio communication system may be referred to as a Multiple Input Multiple Output (MIMO) system.

Figure 11:
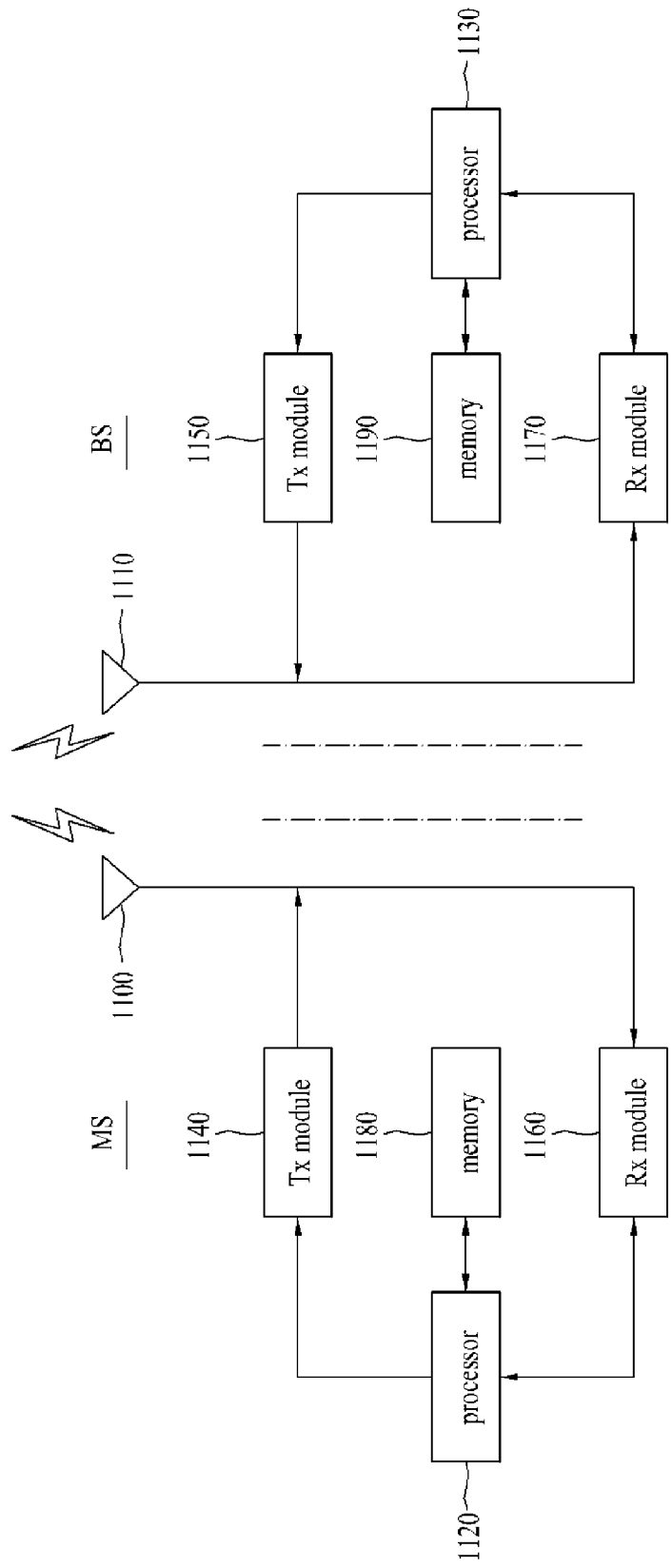
FIG. 11 illustrates an MS and a BS, which support the DCI size adjustment methods described in the present invention, according to an embodiment of the present invention.

FIG. 11 illustrates an MS and a BS, which support the DCI size adjustment methods described in the present invention, according to an embodiment of the present invention.

The MS may operate as a transmitter in uplink and may operate as a receiver in downlink. In addition, the BS may operate as a receiver in uplink and may operate as a transmitter in downlink.

Specifically, the MS and the BS may include transmission modules (Tx modules) 1140 and 1150 and reception modules (Rx modules) 1150 and 1170 to control transmission and reception of information, data, and/or messages, respectively, and may also include antennas 1100 and 1110 to transmit and receive information, data, and/or messages, respectively. The MS and the BS may further include processors 1120 and 1130 to perform the embodiments of the present invention described above and memories 1180 and 1190 which can temporarily or persistently store processes performed by the processors, respectively.

Specifically, the processors 1120 and 1130 may perform the DCI format size adjustment operations described above in the embodiments of the present invention. Each of the processors 1120 and 1130 of FIG. 11 may further include a Radio Frequency (RF)/Intermediate Frequency (IF) module.

The transmission and reception modules included in each of the MS and the BS may perform a packet modulation/demodulation function for data transmission, a fast packet channel coding function, an Orthogonal Frequency Division Multiple Access (OFDMA) packet scheduling function, a Time Division Duplexing (TDD) packet scheduling function, and/or a channel multiplexing function.

The apparatuses described above with reference to FIG. 11 are means for implementing the various DCI format size adjustment methods described in the present invention. The embodiments of the present invention can be implemented using the components and functions of the MS and BS apparatuses described above.

A Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a handheld PC, a notebook computer, a smartphone, or a MultiMode-MultiBand (MM-MB) terminal may be used as the mobile terminal in the present invention.

Here, the term "smartphone" refers to a terminal which combines advantageous features of a mobile communication terminal and a PDA, specifically, a terminal constructed by incorporating functions of a PDA, such as a scheduling function, a facsimile transmission and reception function, and a data communication function including an Internet connection function, into a mobile communication terminal: The term "MM-MB terminal" refers to a terminal that includes a multi-modem chip such that it can operate in all communication systems such as a portable internet system and other mobile communication systems (for example, a Code Division Multiple Access (CDMA) 2000 system, a Wideband CDMA (WCDMA) system, etc.).

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described above. For example, software code can be stored in a memory unit 1180 or 1190 so as to be executed by a processor 1120 or 1130. The memory unit may be located inside or outside the processor and can communicate data with the processor through a variety of known means.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

The embodiments of the present invention may be applied to various wireless access systems. Examples of the wireless access systems include a 3rd Generation Partnership Project (3GPP) LTE system, a 3GPP2 system, and/or an Institute of Electrical and Electronic Engineers 802 (IEEE 802.xx) system. The embodiments of the present invention may be applied not only to various wireless access systems but also to all technical fields to which the various wireless access systems are applied.

The invention claimed is:

1. A method for receiving a Physical Downlink Control Channel (PDCCH) in a wireless access system that supports multiple carriers, the method comprising:

performing blind decoding in a search space allocated to a user equipment in order to search for the PDCCH; and receiving a PDCCH including Downlink Control Information (DCI), whose size has been adjusted, in the search space, wherein the size of the DCI has been adjusted taking into consideration bandwidth allocated to the user equipment and a transmission mode of a Component Carrier (CC) allocated to the user equipment, wherein the size of the DCI is adjusted based on the transmission mode of the CC allocated to the user equipment, when the difference in payload sizes of the DCI according to the bandwidth is less than a threshold value, and wherein the size of the DCI is adjusted for each bandwidth group formed through bandwidth grouping, when the difference in payload sizes of the DCI according to the bandwidth is greater than the threshold value.

2. The method according to claim 1, wherein the size of the DCI has been adjusted further taking into consideration the number of antennas of the user equipment.

3. The method according to claim 1, wherein the size of the DCI has been adjusted by adjusting sizes of DCI formats other than DCI formats which are transmitted in a common search space.

4. The method according to claim 1, further comprising:

receiving at least one of information regarding the bandwidth allocated to the user equipment, information regarding the transmission mode of the CC allocated to the user equipment and information regarding the number of antennas available for the user equipment from a base station through uplink scheduling.

5. A user equipment for receiving a Physical Downlink Control Channel (PDCCH) in a wireless access system that supports multiple carriers, the user equipment comprising:
- a transmitter;
- a receiver; and
- a processor,
- wherein the user equipment controls the processor and the receiver to perform blind decoding in a search space allocated to the user equipment in order to search for the PDCCH and to receive a PDCCH including Downlink Control Information (DCI), whose size has been adjusted, in the search space, and
- wherein the size of the DCI has been adjusted taking into consideration bandwidth allocated to the user equipment and a transmission mode of a Component Carrier (CC) allocated to the user equipment,
- wherein the size of the DCI is adjusted based on the transmission mode of the CC allocated to the user equipment, when the difference in payload sizes of the DCI according to the bandwidth is less than a threshold value and,
- wherein the size of the DCI is adjusted for each bandwidth group formed through bandwidth grouping, when the difference in payload sizes of the DCI according to the bandwidth is more than the threshold value.

6. The user equipment according to claim 5, wherein the size of the DCI has been adjusted further taking into consideration the number of antennas of the user equipment.

7. The user equipment according to claim 5, wherein the size of the DCI has been adjusted by adjusting sizes of DCI formats other than DCI formats which are transmitted in a common search space.

8. The user equipment according to claim 5, wherein the user equipment receives, using the receiver, at least one of information regarding the bandwidth allocated to the user equipment, information regarding the transmission mode of the CC allocated to the user equipment and information regarding the number of antennas available for the user equipment from a base station through uplink scheduling.

9. The method according to claim 1, wherein DCI formats having same payload size are received through a same search space and the DCI formats having same payload size are distinguished to each other by using a Format Indication Flag (FIF).

10. The method according to claim 9, wherein a Carrier Indicator Field (CIF) scheduling the multiple carriers is used for the FIF.

11. The method according to claim 1, wherein the bandwidth grouping is performed by using a same bandwidth grouping for all DCI formats or an optimized grouping for each DCI formats.

12. The method according to claim 11, wherein the optimized grouping is a grouping that adjusting sizes of the each DCI formats to decrease a difference between a smallest DCI payload size and a largest DCI payload size.

13. The user equipment according to claim 5, wherein DCI formats having same payload size are received through a same search space and the DCI formats having same payload size are distinguished to each other by using a Format Indication Flag (FIF).

14. The user equipment according to claim 13, wherein a Carrier Indicator Field (CIF) scheduling the multiple carriers is used for the FIF.

15. The user equipment according to claim 5, wherein the bandwidth grouping is performed by using a same bandwidth grouping for all DCI formats or an optimized grouping for each DCI formats.

16. The user equipment according to claim 15, wherein the optimized grouping is a grouping that adjusting sizes of the each DCI formats to decrease a difference between a smallest DCI payload size and a largest DCI payload size.

* * * * *